US012649310B2

(12) United States Patent
Takabe et al.

(10) Patent No.: US 12,649,310 B2
(45) Date of Patent: Jun. 9, 2026

(54) LIQUID DISCHARGE APPARATUS

(71) Applicant: SEIKO EPSON CORPORATION, Tokyo (JP)

(72) Inventors: Motoki Takabe, Shiojiri (JP); Sosuke Yamasaki, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 157 days.

(21) Appl. No.: 18/442,174

(22) Filed: Feb. 15, 2024

(65) Prior Publication Data

US 2024/0278559 A1 Aug. 22, 2024

(30) Foreign Application Priority Data

Feb. 17, 2023 (JP) ................................ 2023-023492

(51) Int. Cl.
*B41J 2/14* (2006.01)
*B41J 2/175* (2006.01)
*B41J 3/54* (2006.01)

(52) U.S. Cl.
CPC ....... *B41J 2/14201* (2013.01); *B41J 2/17526* (2013.01); *B41J 3/543* (2013.01); *B41J 2202/13* (2013.01)

(58) Field of Classification Search
CPC .................................................... B41J 2/14072
See application file for complete search history.

(56) References Cited

U.S. PATENT DOCUMENTS

2006/0044355 A1* 3/2006 Ito ........................ B41J 2/14209 347/59
2007/0229596 A1* 10/2007 Chikamoto .......... B41J 2/14209 347/50
2013/0120501 A1* 5/2013 Enomoto ............. B41J 2/14233 347/50
2013/0187976 A1 7/2013 Kobayashi
2019/0126618 A1* 5/2019 Kitazawa ............. B41J 2/14233
2021/0060950 A1* 3/2021 Kanegae .................. B41J 2/155
2022/0032613 A1* 2/2022 Yokoo ..................... B41J 2/1707

FOREIGN PATENT DOCUMENTS

JP 2013-151094 A 8/2013

* cited by examiner

*Primary Examiner* — Shelby L Fidler
(74) *Attorney, Agent, or Firm* — WORKMAN NYDEGGER

(57) ABSTRACT

A first drive circuit substrate is provided at a position displaced to the other side in a first direction with respect to a center of a first head in the first direction. A first circuit side terminal is provided on a first surface of the first drive circuit substrate which faces one side in the first direction. A second circuit side terminal is provided on a second surface of the first drive circuit substrate which faces the other side in the first direction. When a direction orthogonal to both the first direction and a second direction is defined as a third direction and a side on which the first head is viewed from the first drive circuit substrate along the third direction is defined as a predetermined side, the first circuit side terminal provided at a position on the predetermined side with respect to the second circuit side terminal.

14 Claims, 10 Drawing Sheets

LIQUID DISCHARGE APPARATUS

The present application is based on, and claims priority from JP Application Serial Number 2023-023492, filed Feb. 17, 2023, the disclosure of which is hereby incorporated by reference herein in its entirety.

BACKGROUND

1. Technical Field

The present disclosure relates to a liquid discharge apparatus.

2. Related Art

In a liquid discharge apparatus typified by an ink jet printer, a plurality of heads that discharge a liquid such as an ink as a droplet are generally mounted in a unitized state as a head unit.

For example, a head unit disclosed in JP-A-2013-151094 includes a plurality of heads and a holding member to which the plurality of heads are fixed. In JP-A-2013-151094, each head has two nozzle rows, and two chip on film (COF) substrates provided for each nozzle row are drawn out in each head.

In the head unit disclosed in JP-A-2013-151094, the two COF substrates are drawn out from directly above the head. Therefore, a member such as a flow path member for supplying a liquid to the head cannot be disposed directly above the head. Under these circumstances, it is desirable to realize a head unit in which both ensured reliability and cost reduction can be achieved and other members such as a flow path member can be disposed directly above a head.

SUMMARY

According to an aspect of the present disclosure, there is provided a liquid discharge apparatus including a head unit including a first head including a first piezoelectric element, a first head side terminal electrically coupled to the first piezoelectric element, a second piezoelectric element, a second head side terminal electrically coupled to the second piezoelectric element, a second head having a portion which overlaps the first head when viewed in a first direction and another portion which does not overlap the first head, and located at a position which does not overlap the first head when viewed in a second direction orthogonal to the first direction, and a fixing portion to which the first head and the second head are fixed, a first drive circuit substrate provided with a first circuit side terminal and a second circuit side terminal, a first flexible wiring substrate having one end coupled to the first head side terminal and the other end coupled to the first circuit side terminal, and drawn out from a position on one side of the first head in the first direction, and a second flexible wiring substrate having one end coupled to the second head side terminal and the other end coupled to the second circuit side terminal, and drawn out from a position on the other side of the first head in the first direction. The first drive circuit substrate is provided at a position displaced to the other side in the first direction with respect to a center of the first head in the first direction. The first circuit side terminal is provided on a first surface of the first drive circuit substrate which faces one side in the first direction. The second circuit side terminal is provided on a second surface of the first drive circuit substrate which faces the other side in the first direction. When a direction orthogonal to both the first direction and the second direction is defined as a third direction, and a side on which the first head is viewed from the first drive circuit substrate along the third direction is defined as a predetermined side, the first circuit side terminal is provided at a position on the predetermined side with respect to the second circuit side terminal.

DESCRIPTION OF EMBODIMENTS

Figure 1:
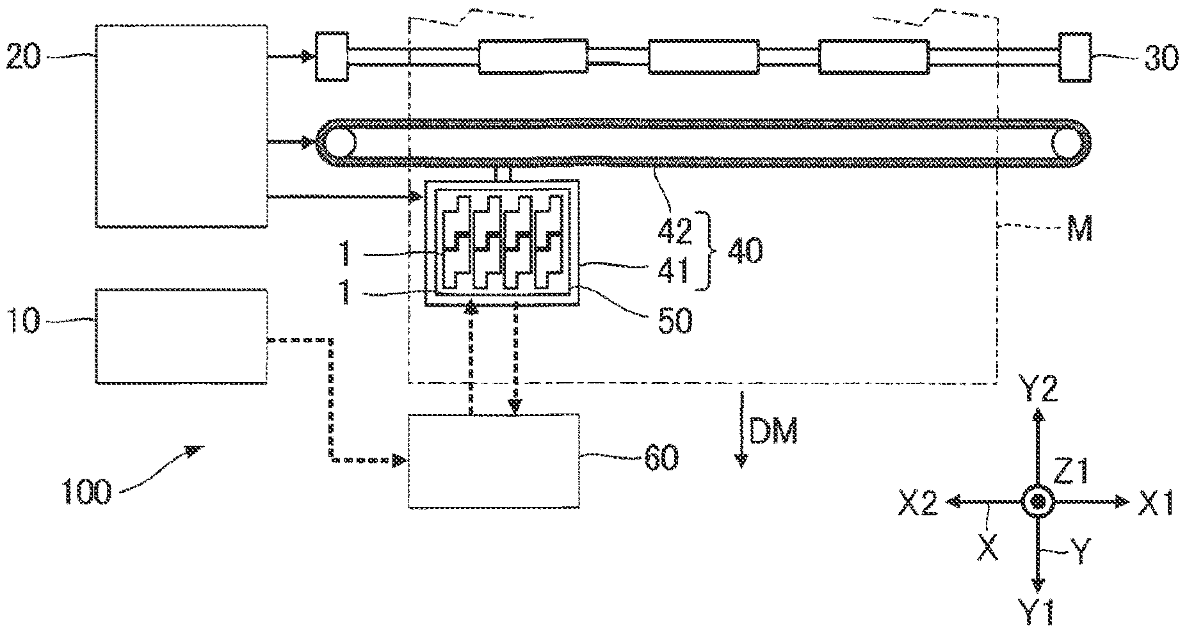
FIG. 1 is a schematic view illustrating a configuration example of a liquid discharge apparatus according to an embodiment.

Hereinafter, preferred embodiments according to the present disclosure will be described with reference to the accompanying drawings. In the drawings, dimensions and scales of each portion are appropriately different from actual ones, and some portions are schematically illustrated to facilitate understanding. In addition, the scope of the present disclosure is not limited to forms thereof unless the present disclosure is particularly limited in the following description.

Hereinafter, for convenience of description, an X-axis, a Y-axis and a Z-axis which intersect each other are appropriately used. A direction along the X-axis is an example of a “first direction”, a direction along the Y-axis is an example of a “second direction”, and a direction along the Z-axis is an example of a “third direction”. In addition, hereinafter, one direction along the X-axis is an X1-direction, and a direction opposite to the X1-direction is an X2-direction. The X1-direction is an example of “one side in the first direction”, and the X2-direction is an example of “the other side in the first direction”. Similarly, directions opposite to each other along the Y-axis are a Y1-direction and a Y2-direction, and directions opposite to each other along the Z-axis are a Z1-direction and a Z2-direction. A Z2-direction is an example of a “predetermined side”.

Here, typically, the Z-axis is a vertical axis, and the Z2-direction corresponds to a downward direction in a vertical direction. However, the Z-axis may not be the vertical axis. In addition, the X-axis, the Y-axis, and the Z-axis are typically orthogonal to each other. However, without being limited thereto, for example, all of these may intersect each other at an angle within a range of 80° or larger and 100° or smaller.

1. Embodiment

1-1. Schematic Configuration of Liquid Discharge Apparatus

FIG. 1 is a schematic view illustrating a configuration example of a liquid discharge apparatus 100 according to an embodiment. The liquid discharge apparatus 100 is an ink jet printing apparatus that discharges an ink which is an example of liquid as a droplet to a medium M. The medium M is typically a printing sheet. The medium M is not limited to the printing sheet, and may be a printing target having any desired material such as a resin film or a cloth.

As illustrated in FIG. 1, the liquid discharge apparatus 100 includes a liquid container 10, a control unit 20, a transport mechanism 30, a moving mechanism 40, a head module 50, and a circulation mechanism 60. Hereinafter, all of these will be briefly described in order with reference to FIG. 1.

The liquid container 10 stores the ink. As a specific aspect of the liquid container 10, for example, a cartridge that can be attached to and detached from the liquid discharge apparatus 100, a bag-shaped ink pack formed of a flexible film, and an ink tank that can be refilled with the ink may be used.

Although not illustrated, the liquid container 10 of the present embodiment has a plurality of containers that store mutually different types of the ink. The ink stored in the plurality of containers is not particularly limited, and any desired type of the ink may be used.

The control unit 20 controls an operation of each element of the liquid discharge apparatus 100. For example, the control unit 20 includes a processing circuit such as a central processing unit (CPU) and a field programmable gate array (FPGA) and a storage circuit such as a semiconductor memory. The control unit 20 outputs a drive signal for driving the head module 50 and a control signal for controlling the driving.

The transport mechanism 30 transports the medium M in a transport direction DM which is the Y1-direction under the control of the control unit 20. The moving mechanism 40 causes the head module 50 to reciprocate in the X1-direction and the X2-direction under the control of the control unit 20. In an example illustrated in FIG. 1, the moving mechanism 40 includes a substantially box-shaped transport body 41 called a carriage for accommodating the head module 50, and a transport belt 42 to which the transport body 41 is fixed. In addition to the head module 50, the above-described liquid container 10 may be mounted on the transport body 41.

Under the control of the control unit 20, the head module 50 discharges the ink supplied from the liquid container 10 via the circulation mechanism 60, from each of the plurality of nozzles to the medium M in the Z2-direction. The ink is simultaneously discharged when the medium M is transported by the transport mechanism 30 and the head module 50 is caused to reciprocate by the moving mechanism 40. In this manner, an image is formed on a surface of the medium M by using the ink. The head module 50 has a plurality of head units 1.

In the example illustrated in FIG. 1, the liquid container 10 is coupled to the head module 50 via the circulation mechanism 60. The circulation mechanism 60 is a mechanism for supplying the ink to the head module 50 and collecting the ink discharged from the head module 50 to resupply the ink to the head module 50. Since the circulation mechanism 60 is operated, an increase in viscosity of the ink can be suppressed, or accumulated air bubbles inside the ink can be reduced. The circulation mechanism 60 may be provided when needed, or may be omitted.

1.2. Head Module

Figure 2:
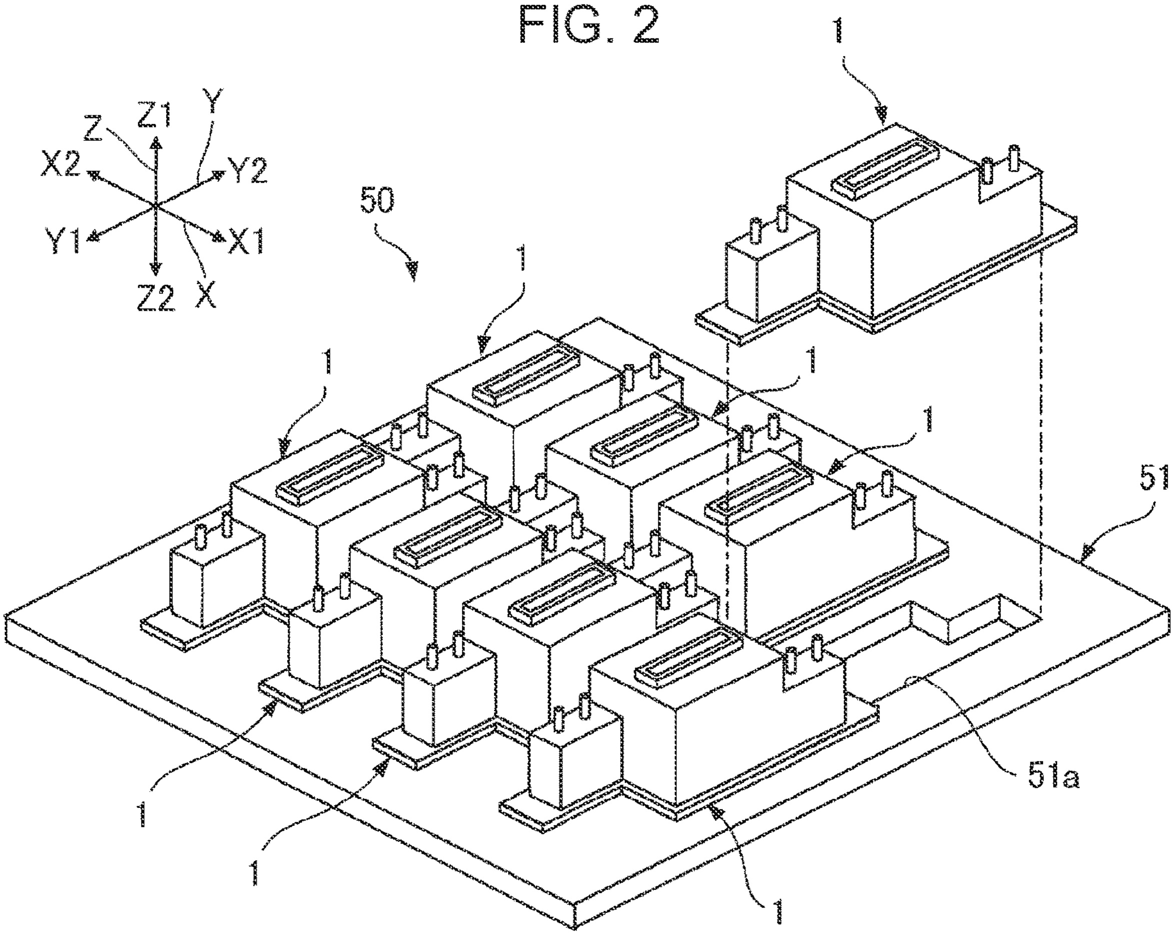
FIG. 2 is a perspective view of a head module.

FIG. 2 is a perspective view of the head module 50. As illustrated in FIG. 2, the head module 50 includes a support body 51 and the plurality of head units 1.

The support body 51 is a plate-shaped member that supports the plurality of head units 1. The support body 51 is provided with a plurality of attachment holes 51*a*. Each head unit 1 is fixed by being screwed to the support body 51 in a state of being inserted into the attachment hole 51*a*. The plurality of head units 1 are disposed in a matrix-shape along the X-axis and the Y-axis.

The number and a disposition of the head units 1 included in the head module 50 are not limited to an example illustrated in FIG. 2, and may be set in any desired way. In addition, a shape of the support body 51 is not limited to the example illustrated in FIG. 2, and may be set in any desired way.

1-3. Head Unit

Figure 3:
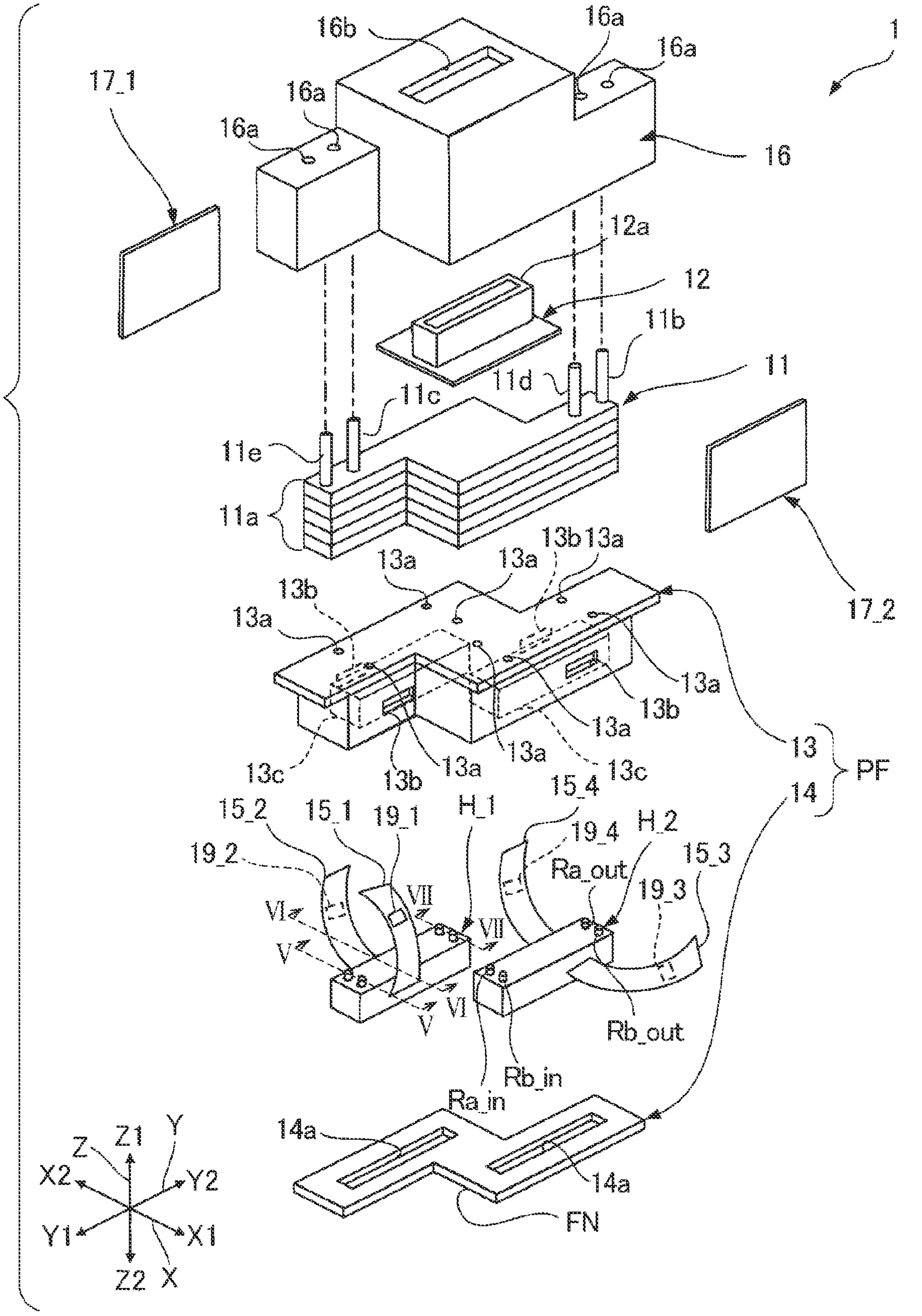
FIG. 3 is an exploded perspective view of a head unit.

FIG. 3 is an exploded perspective view of the head unit 1. As illustrated in FIG. 3, the head unit 1 includes a flow path structure 11, a wiring substrate 12, a holder 13, a first head H_1, a second head H_2, a fixing plate 14, a first flexible wiring substrate 15_1, and a second flexible wiring substrate 15_2, a third flexible wiring substrate 15_3, a fourth flexible wiring substrate 15_4, a cover 16, a first drive circuit substrate 17_1, and a second drive circuit substrate 17_2. Here, the holder 13 and the fixing plate 14 form a fixing portion PF.

Hereinafter, each of the first head H_1 and the second head H_2 may be referred to as a head H in some cases. Each of the first flexible wiring substrate 15_1, the second flexible wiring substrate 15_2, the third flexible wiring substrate 15_3, and the fourth flexible wiring substrate 15_4 may be referred to as a flexible wiring substrate 15 in some cases. Each of the first drive circuit substrate 17_1 and the second drive circuit substrate 17_2 may be referred to as a drive circuit substrate 17 in some cases.

In the head unit 1, the cover 16, the wiring substrate 12, the flow path structure 11, the holder 13, the two heads H, and the fixing plate 14 are aligned in this order in the Z2-direction. In addition, inside the cover 16, the second drive circuit substrate 17_2 is disposed at a position in the X1-direction with respect to the flow path structure 11. On the other hand, the first drive circuit substrate 17_1 is disposed at a position in the X2-direction with respect to the flow path structure 11. Furthermore, the first drive circuit substrate 17_1 is electrically coupled to the first head H_1 via the first flexible wiring substrate 15_1 and the second flexible wiring substrate 15_2. Similarly, the second drive circuit substrate 17_2 is electrically coupled to the second head H_2 via the third flexible wiring substrate 15_3 and the fourth flexible wiring substrate 15_4. Hereinafter, each part of the head unit 1 will be sequentially described.

The flow path structure 11 is a structure internally provided with a flow path for supplying the ink from the circulation mechanism 60 to the two heads H. The flow path structure 11 includes a flow path member 11*a* and four coupling tubes 11*b* to 11*e*. The flow path member 11*a* is an example of a "first flow path member".

Although not illustrated in FIG. 3, the flow path member 11*a* is provided with two supply flow paths for supplying two types of the ink to two heads H for each ink, and two discharge flow paths for discharging the two types of the ink from the two heads H for each ink. Hereinafter, one of the two types of the ink may be referred to as a first ink, and the other may be referred to as a second ink in some cases. The types of the ink used in the liquid discharge apparatus 100 are not limited to two types, and one, three, or more types may be used.

The flow path member 11*a* has a configuration of a stacked body in which a plurality of substrates are stacked in a direction along the Z-axis. For example, each of the plurality of substrates is formed of a resin material such as Zylon, polyphenylene sulfide (PPS), or polypropylene (PP), and is formed by means of injection molding. The "Zylon" is a registered trademark. In addition, for example, the plurality of substrates are joined together by using an adhesive such as an epoxy-based adhesive. The number or a thickness of the substrates forming the flow path member 11*a* is not limited to an example illustrated in FIG. 3, and may be set in any desired way.

Each of the coupling tubes 11*b*, 11*c*, 11*d*, and 11*e* is a tube body protruding from a surface of the flow path member 11*a* which faces the Z1-direction. The coupling tube 11*b* is coupled to one of the two supply flow paths, and the coupling tube 11*c* is coupled to the other of the two supply flow paths. The coupling tube 11*d* is coupled to one of the two discharge flow paths, and the coupling tube 11*e* is coupled to the other of the two discharge flow paths.

The wiring substrate 12 is a mounting component for electrically coupling the head unit 1 to the control unit 20. For example, the wiring substrate 12 is formed of a flexible wiring substrate or a rigid wiring substrate. The wiring substrate 12 is disposed on a surface which faces the Z1-direction of the flow path structure 11. The flow path structure 11 faces a surface of the wiring substrate 12 which faces the Z2-direction. A connector 12*a* is installed on a surface of the wiring substrate 12 which faces the Z1-direction. The connector 12*a* is a coupling component for electrically coupling the head unit 1 and the control unit 20 to each other.

The holder 13 is a structure for holding the two heads H. In addition, the flow path structure 11 is fixed to a surface of the holder 13 which faces the Z1-direction by means of screwing. For example, the holder 13 is formed of a resin material or a metal material. The holder 13 is provided with a plurality of holder flow paths 13*a*, a plurality of wiring holes 13*b*, and a plurality of recess portions 13*c*. Each of the plurality of holder flow paths 13*a* is a hole for causing the ink to flow between the head H and the flow path structure 11. The holder flow paths 13*a* are provided to correspond to each of introduction ports Ra_in and Rb_in and discharge ports Ra_out and Rb_out (to be described later). Each of the plurality of wiring holes 13*b* is a hole through which the flexible wiring substrate 15 passes, and two wiring holes 13*b* are provided on each of the surfaces of the holder 13 which faces the X1-direction and which faces the X2-direction. Each of the recess portion 13*c* is open toward the Z2-direction, and is a space for accommodating the head H.

Each head H discharges the ink. Each head H is provided with the introduction ports Ra_in and Rb_in and the discharge ports Ra_out and Rb_out. The introduction port Ra_in is an opening for introducing the first ink, the introduction port Rb_in is an opening for introducing the second ink, the discharge port Ra_out is an opening for discharging the first ink, and the discharge port Rb_out is an opening for discharging the second ink. The introduction ports Ra_in and Rb_in and the discharge ports Ra_out and Rb_out are respectively and mutually joined to the head H and the holder 13 by using an adhesive. In this manner, both ports are liquid-tightly coupled to the corresponding holder flow path 13*a*. A configuration of the head H will be described in detail with reference to FIG. 5 (to be described later).

The first drive circuit substrate 17_1 is electrically coupled to the first head H_1 via the first flexible wiring substrate 15_1 and the second flexible wiring substrate 15_2. Similarly, the second drive circuit substrate 17_2 is electrically coupled to the second head H_2 via the third flexible wiring substrate 15_3 and the fourth flexible wiring substrate 15_4.

For example, each flexible wiring substrate 15 is a flexible wiring substrate such as a chip on film (COF), a flexible printed circuit (FPC), or a flexible flat cable (FFC). The first drive circuit 19_1 is mounted on the first flexible wiring substrate 15_1. The second drive circuit 19_2 is mounted on the second flexible wiring substrate 15_2. The third drive circuit 19_3 is mounted on the third flexible wiring substrate 15_3. The fourth drive circuit 19_4 is mounted on the fourth flexible wiring substrate 15_4. Hereinafter, each of the first drive circuit 19_1, the second drive circuit 19_2, the third drive circuit 19_3, and the fourth drive circuit 19_4 may be referred to as a drive circuit 19 in some cases.

The drive circuit 19 is a circuit that switches whether or not to supply at least a portion of waveforms included in a drive signal as a drive pulse, based on a control signal. Specifically, the first drive circuit 19_1 and the second drive circuit 19_2 are circuits for switching the drive signal to be supplied to the first head H_1. On the other hand, the third drive circuit 19_3 and the fourth drive circuit 19_4 are circuits for switching the drive signal to be supplied to the second head H_2.

The drive circuit substrate 17 is a substrate for transmitting the drive signal and the control signal. For example, the drive circuit substrate 17 may be a flexible wiring substrate or a rigid wiring substrate, alternatively, may be a combination of the flexible wiring substrate and the rigid wiring substrate. The drive circuit substrate 17 is electrically coupled to the wiring substrate 12 via a wire (not illustrated). The drive circuit substrate 17 may be formed integrally with the wiring substrate 12.

The fixing plate 14 is a plate-shaped member for fixing two heads H to the holder 13 in common. Here, the fixing plate 14 forms the fixing portion PF together with the holder 13. In this way, the first head H_1 and the second head H_2 are fixed to the fixing portion PF having the holder 13 and the fixing plate 14. Specifically, the fixing plate 14 is disposed in a state where the two heads H are interposed between the fixing plate 14 and the holder 13, and is fixed to the holder 13 by using an adhesive. For example, the fixing plate 14 is formed of a metal material. The fixing plate 14 is provided with a plurality of opening portions 14*a* for exposing nozzles of the two heads H. In an example illustrated in FIG. 3, the plurality of opening portions 14*a* are provided for each of the heads H. A surface of the fixing plate 14 which faces the Z2-direction and a surface of the head H which is exposed from the opening portion 14*a* form a nozzle surface FN. An aspect in which the opening portion 14*a* is shared by the two heads H may be adopted. In addition, another member such as a reinforcing plate may be interposed between the fixing plate 14 and the holder 13.

The cover 16 is a box-shaped member that accommodates the flow path member 11*a* of the flow path structure 11, the wiring substrate 12, and the two drive circuit substrates 17.

For example, the cover 16 is formed of a resin material. The cover 16 is provided with four through-holes 16*a* and an opening portion 16*b*. The four through-holes 16*a* correspond to the coupling tubes 11*b*, 11*c*, 11*d*, and 11*e* of the flow path structure 11, and each of the through-hole 16*a* is inserted into any one of the corresponding coupling tubes 11*b*, 11*c*, 11*d*, and 11*e*. The connector 12*a* passes to the outside through the opening portion 16*b* from the inside of the cover 16.

Figure 4:
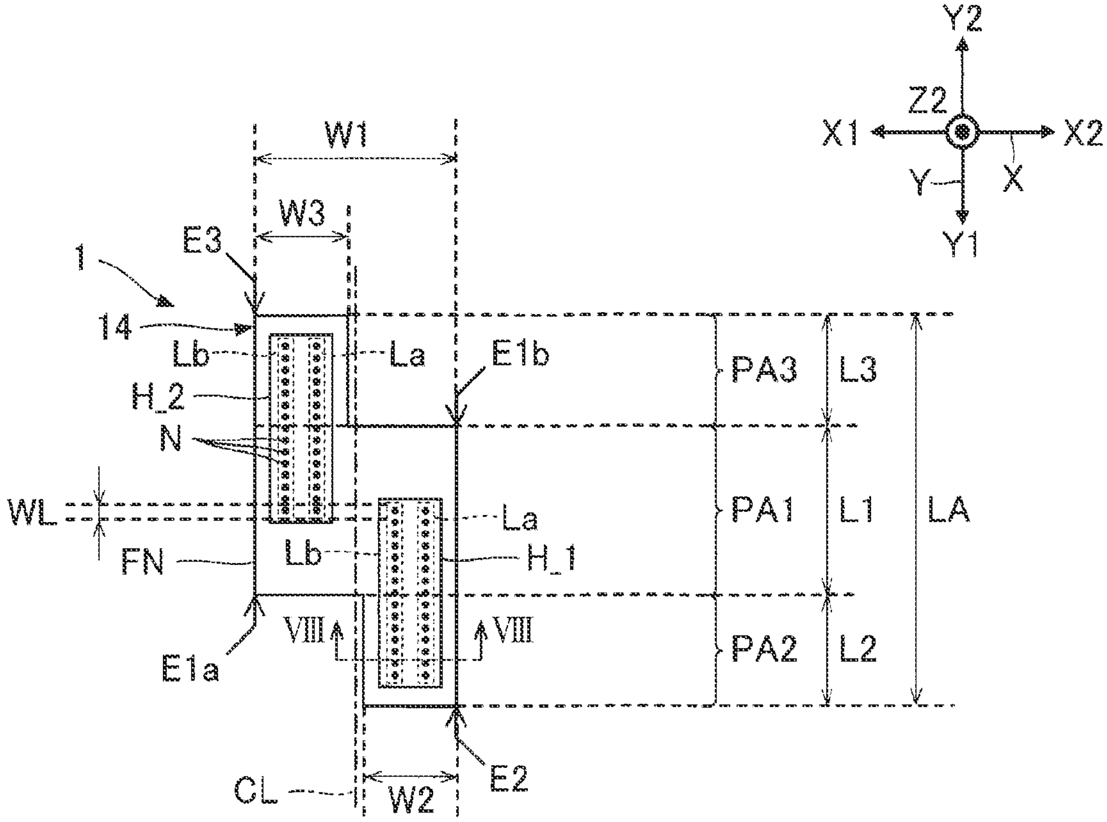
FIG. 4 is a plan view of the head unit.

FIG. 4 is a plan view of the head unit 1. FIG. 4 schematically illustrates a disposition of the heads H in the head unit 1 when viewed in the Z1-direction. That is, FIG. 4 is a schematic plan view of the nozzle surface FN.

As illustrated in FIG. 4, the head unit 1 is divided into a first portion PA1, a second portion PA2, and a third portion PA3. That is, the nozzle surface FN is divided into the first portion PA1, the second portion PA2, and the third portion PA3 when viewed in the Z1-direction.

The first portion PA1 is located between the second portion PA2 and the third portion PA3. In an example illustrated in FIG. 4, the second portion PA2 is disposed at a position in the Y1-direction with respect to the first portion PA1, and the third portion PA3 is disposed at a position in the Y2-direction with respect to the first portion PA1. In this way, the positions of the first portion PA1, the second portion PA2, and the third portion PA3 in the direction along the Y-axis are different from each other.

The second portion PA2 protrudes in the Y2-direction with respect to an end of the first portion PA1 in the Y2-direction. On the other hand, the third portion PA3 protrudes in the Y1-direction with respect to an end of the first portion PA1 in the Y1-direction. In the example illustrated in FIG. 4, the second portion PA2 is disposed at a position in the X2-direction with respect to a center line CL, and the third portion PA3 is disposed at a position in the X1-direction with respect to the center line CL. In this way, the second portion PA2 and the third portion PA3 are disposed at positions in directions opposite to each other across the center line CL. The center line CL is a virtual line segment parallel to the Y-axis and passing through a center of the first portion PA1.

As illustrated in FIG. 4, a width W2 of the second portion PA2 along the X-axis is shorter than a width W1 of the first portion PA1 along the X-axis. Similarly, a width W3 of the third portion PA3 along the X-axis is shorter than the width W1 of the first portion PA1 along the X-axis. In addition, the width W2 and the width W3 are equal to each other in the example illustrated in FIG. 4. The width W2 and the width W3 may be different from each other. However, when the width W2 and the width W3 are equal to each other, symmetry of the shape of the head unit 1 is improved. Therefore, the head unit 1 can be more freely disposed. Therefore, in this case, there is an advantage in that versatility of the head unit 1 is improved. This advantage also contributes to cost reduction of the liquid discharge apparatus 100.

A length L2 of the second portion PA2 along the Y-axis is shorter than a length L1 of the first portion PA1 along the Y-axis. Similarly, a length L3 of the third portion PA3 along the Y-axis is shorter than the length L1 of the first portion PA1 along the Y-axis. In the example illustrated in FIG. 4, the length L2 and the length L3 are equal to each other. Although the length L2 and the length L3 may be different from each other, when the length L2 and the length L3 are equal to each other, symmetry of the shape of the head unit 1 is improved. Therefore, the head unit 1 can be more freely disposed.

Positions of an end E1*b* of the first portion PA1 in the X2-direction and an end E2 of the second portion PA2 in the X2-direction are the same as each other in the direction along the X-axis. The end E1*b* and the end E2 form a continuous plane as an end surface of the head unit 1 in the X2-direction. Similarly, positions of an end Ela of the first portion PA1 in the X1-direction and an end E3 of the third portion PA3 in the X1-direction are the same as each other in the direction along the X-axis. The end Ela and the end E3 form a continuous plane as an end surface of the head unit 1 in the X1-direction. A recess portion or a projection portion may be appropriately provided on the end surfaces. In addition, a step may be provided between the end E1*b* and the end E2 or between the end Ela and the end E3.

The first head H_1 is provided across the first portion PA1 and the second portion PA2. That is, the first head H_1 has a portion provided in the first portion PA1 and the other portion provided in the second portion PA2, and these portions are continuously coupled. On the other hand, the second head H_2 is provided across the first portion PA1 and the third portion PA3. That is, the second head H_2 has a portion provided in the first portion PA1 and the other portion provided in the third portion PA3, and these portions are continuously coupled.

In addition, the first head H_1 is disposed at a position displaced in the Y1-direction with respect to the second head H_2. The first head H_1 is disposed at a position in the X2-direction with respect to the second head H_2. That is, the first head H_1 and the second head H_2 are disposed at positions in directions opposite to each other across the center line CL.

Here, the first head H_1 and the second head H_2 have portions overlapping each other with a width WL along the Y-axis, when viewed in the direction along the X-axis. Since the width WL is provided in this way, seams of images formed by the first head H_1 and the second head H_2 can be inconspicuous. Although the width WL is not particularly limited, for example, the width WL is approximately a length of three times or more and 10 times or less of a pitch of nozzles N of a nozzle row La or a nozzle row Lb (to be described later).

As can be understood from the above, the first head H_1 and the second head H_2 are disposed to partially overlap each other when viewed in the direction along the X-axis and not to overlap each other when viewed in the direction along the Y-axis. In addition, the first head H_1 and the second head H_2 are disposed not to overlap each other when viewed in the direction along the Z-axis.

In this manner, the positions of the first head H_1 and the second head H_2 are displaced from each other in the direction along the Y-axis. Accordingly, as will be described later, the flexible wiring substrate 15 can be drawn out from both ends of each head H in the direction along the X-axis. In this manner, the above-described flow path member 11*a* can be disposed directly above each head H.

In contrast, in an aspect in which the flexible wiring substrate is drawn out directly above the head as in JP-A-2013-151094 described above, the flow path member cannot be disposed directly above the head. In addition, when the positions of the first head H_1 and the second head H_2 in the direction along the Y-axis coincide with each other, the second head H_2 faces the end of the first head H_1 in the X1-direction. Similarly, the first head H_1 faces the end of the second head H_2 in the X2-direction. Therefore, the flexible wiring substrate 15 can only be drawn out from one side end of each head H in the X-axis direction. Alternatively, when a separation distance between the first head H_1 and the second head H_2 in the X-direction is increased, even when the positions of the first head H_1 and the second head H_2 in the Y-direction coincide with each other, each of the flexible wiring substrates 15 can be drawn out from the end of the first head H_1 in the X1-direction or the end of the second head H_2 in the X2-direction. However, in that case, there is an adverse effect in that a whole size of the head unit 1 increases.

On the other hand, when the flow path member 11*a* is disposed directly above the head H, the drive circuit substrate 17 is less likely to be disposed directly above the head H. Therefore, the drive circuit substrate 17 is disposed to be displaced in the X1-direction or in the X2-direction with respect to the center of the head H in the direction along the X-axis. When the drive circuit substrate 17 is disposed in this way, one flexible wiring substrate 15 of the two flexible wiring substrates 15 drawn out from both ends of each head H in the X-axis direction needs to pass between the head H and the flow path member 11*a*. When the one flexible wiring substrate 15 is complicatedly bent, there is a problem of reliability. Therefore, the head unit 1 has a configuration with regard to coupling positions of the two flexible wiring substrates 15 with respect to the drive circuit substrate 17 as will be described later with reference to FIGS. 8 to 10.

1-3. Head

Figure 5:
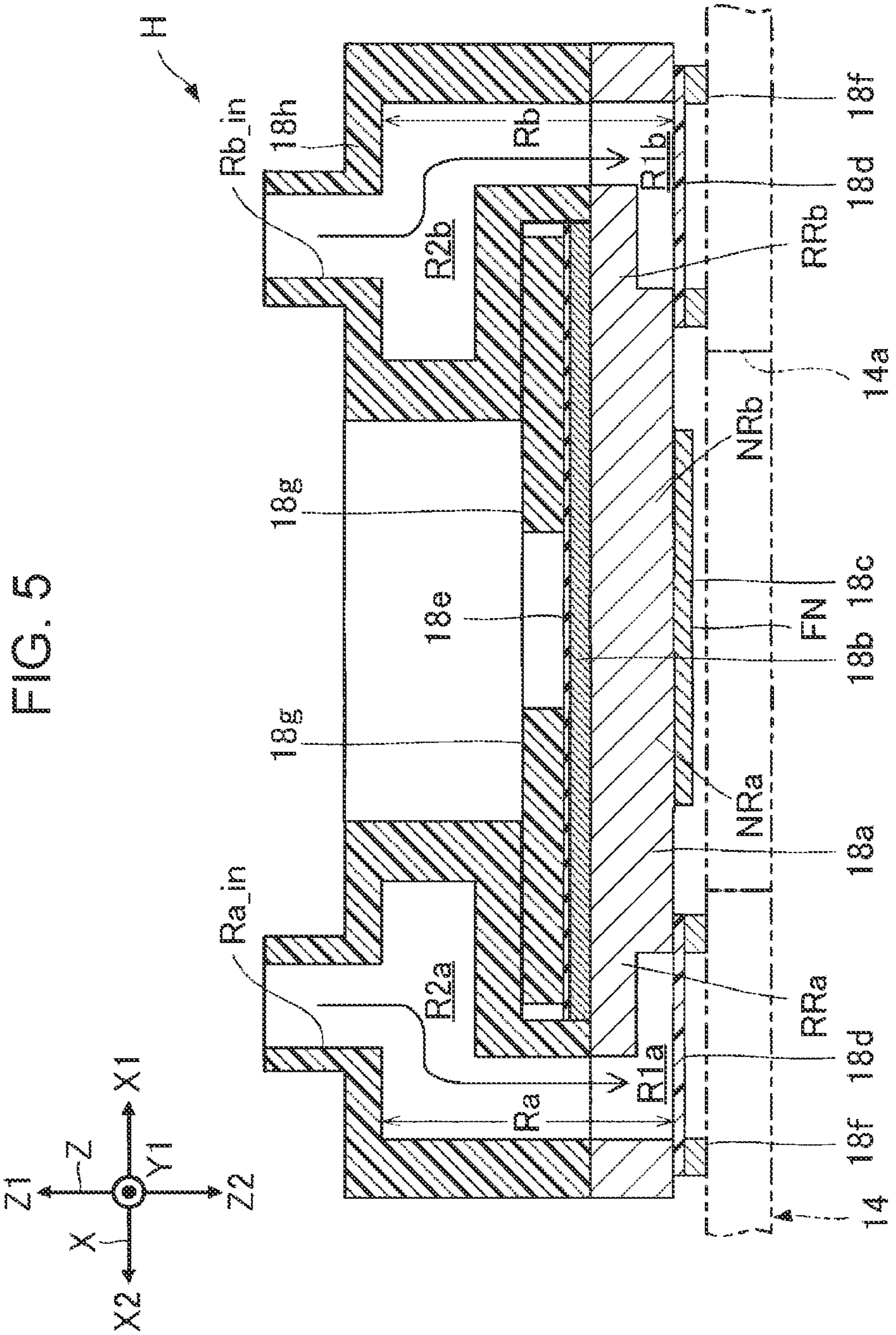
FIG. 5 is a sectional view taken along line V-V in FIG. 3.
Figure 6:
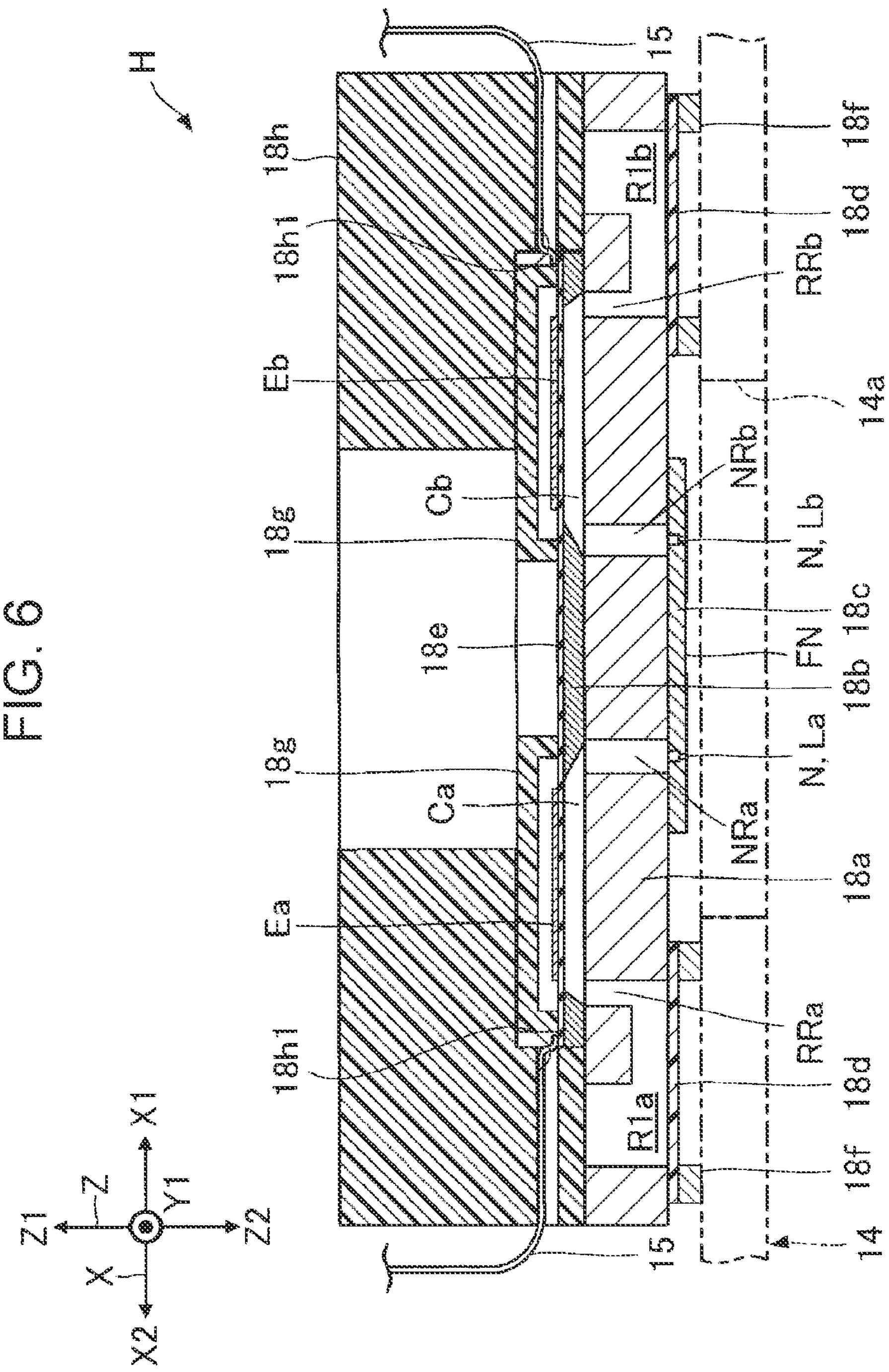
FIG. 6 is a sectional view taken along line VI-VI in FIG. 3.
Figure 7:
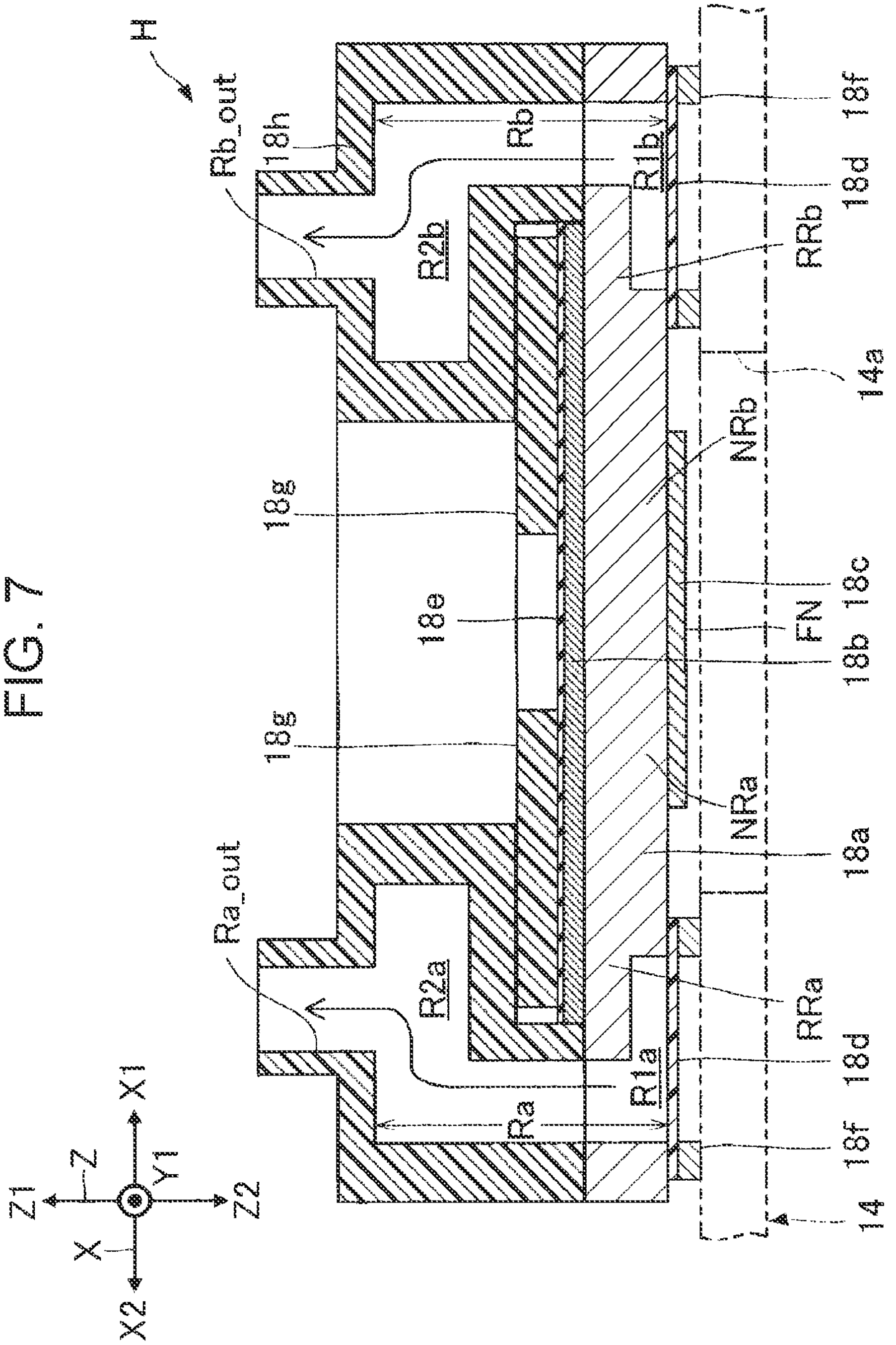
FIG. 7 is a sectional view taken along line VII-VII in FIG. 3.

FIGS. 5 to 7 are sectional views illustrating a configuration example of the head H. FIG. 5 is a sectional view taken along line V-V in FIG. 3, FIG. 6 is a sectional view taken along line VI-VI in FIG. 3, and FIG. 7 is a sectional view taken along line VII-VII in FIG. 3. As illustrated in FIGS. 5 to 7, the head H includes a flow path substrate 18*a*, a pressure chamber substrate 18*b*, a nozzle plate 18*c*, a vibration absorber 18*d*, a vibration plate 18*e*, a plurality of piezoelectric elements Ea and Eb, a cover 18*g*, and a case 18*h*. Here, when the head H is the first head H_1, the piezoelectric element Ea is an example of a "first piezoelectric element", and the piezoelectric element Eb is an example of a "second piezoelectric element".

The flow path substrate 18*a* and the pressure chamber substrate 18*b* are stacked in this order in the Z1-direction, and form a flow path for supplying the ink to the plurality of nozzles N. The vibration plate 18*e*, the plurality of piezoelectric elements Ea and Eb, the cover 18*g*, the case 18*h*, the flexible wiring substrate 15, and the drive circuit 19 are installed in a region located in the Z1-direction with respect to a stacked body including the flow path substrate 18*a* and the pressure chamber substrate 18*b*. On the other hand, the nozzle plate 18*c* and the vibration absorber 18*d* are installed in a region located in the Z2-direction with respect to the stacked body. Each element of the head His schematically a plate-shaped member elongated in the Y-direction, and the elements are joined to each other by using an adhesive or by means of direct joining, for example. Hereinafter, each element of the head H will be described in order.

As illustrated in FIG. 6, the nozzle plate 18*c* is a plate-shaped member provided with the plurality of nozzles N. Each of the plurality of nozzles N is a through-hole through which the ink passes. The plurality of nozzles N provided in the nozzle plate 18*c* are divided into the nozzle row La and the nozzle row Lb. Each of the nozzle row La and the nozzle row Lb is a set of the plurality of nozzles N arranged along the Y-axis. The nozzle row La and the nozzle row Lb are disposed at an interval from each other in the X-axis direction.

Here, a surface of the nozzle plate 18*c* which faces the Z2-direction is exposed from the opening portion 14*a* of the above-described fixing plate 14, and forms a portion of the nozzle surface FN. For example, the nozzle plate 18*c* is manufactured in such a manner that a silicon single crystal substrate is processed by using a semiconductor manufacturing technique using a processing technique such as dry etching or wet etching. However, other known methods and materials may be appropriately used to manufacture the nozzle plate 18*c*. In addition, a cross-sectional shape of the nozzle is typically a circular shape, but the shape is not limited thereto. For example, the cross-sectional shape of the nozzle may be a non-circular shape such as a polygonal shape or an elliptical shape.

As illustrated in FIGS. 5 to 7, the flow path substrate 18*a* is provided with spaces R1*a* and R1*b*, a plurality of supply flow paths RRa and RRb, and a plurality of communication flow paths NRa and NRb for each of the nozzle rows La and nozzle rows Lb. Each of the spaces R1*a* and R1*b* is an elongated opening extending in the direction along the Y-axis in a plan view in the direction along the Z-axis. Each of the supply flow paths RRa and RRb and the communication flow paths NRa and NRb is a through-hole formed for each nozzle N. Each supply flow path RRa communicates with the space R1*a*. Each supply flow path RRb communicates with the space R1*b*.

As illustrated in FIG. 6, the pressure chamber substrate 18*b* is a plate-shaped member provided with a plurality of pressure chambers Ca and a plurality of pressure chambers Cb. The plurality of pressure chambers Ca are arranged in the direction along the Y-axis. Similarly, the plurality of pressure chambers Cb are arranged in the direction along the Y-axis. Each of the pressure chambers Ca is an elongated space formed for each nozzle N of the nozzle row La and extending in the direction along the X-axis in a plan view. Similarly, each of the pressure chamber Cb is an elongated space formed for each nozzle N of the nozzle row Lb and extending in the direction along the X-axis in a plan view. As in the above-described nozzle plate 18*c*, each of the flow path substrate 18*a* and the pressure chamber substrate 18*b* is manufactured in such a manner that the silicon single crystal substrate is processed by using the semiconductor manufacturing technique, for example. However, other known methods and materials may be appropriately used to manufacture each of the flow path substrate 18*a* and the pressure chamber substrate 18*b*.

The pressure chamber Ca communicates with each of the communication flow path NRa and the supply flow path RRa. Therefore, the pressure chamber Ca communicates with the nozzle N of the nozzle row La via the communication flow path NRa, and communicates with the space R1*a* via the supply flow path RRa. Similarly, the pressure chamber Cb communicates with each of the communication flow path NRb and the supply flow path RRb. Therefore, the pressure chamber Cb communicates with the nozzle N of the nozzle row Lb via the communication flow path NRb, and communicates with the space R1*b* via the supply flow path RRb.

As illustrated in FIGS. 5 to 7, the vibration plate 18*e* is disposed on a surface of the pressure chamber substrate 18*b* which faces the Z1-direction. The vibration plate 18*e* is a plate-shaped member which can elastically vibrate. For example, the vibration plate 18*e* has a first layer and a second layer, and the first layer and the second layer are stacked in this order in the Z1-direction. For example, the first layer is an elastic film formed of silicon oxide ($SiO_2$). For example, the elastic film is formed by thermally oxidizing one surface of a silicon single crystal substrate. For example, the second layer is an insulating film formed of zirconium oxide ($ZrO_2$). For example, the insulating film is formed in such a manner that a zirconium layer is formed by using a sputtering method and the layer is thermally oxidized. The vibration plate 18*e* is not limited to the above-described configuration of stacking the first layer and the second layer. For example, the vibration plate 18*e* may be formed of a single layer, or may be formed of three or more layers.

As illustrated in FIG. 6, the plurality of piezoelectric elements Ea and the plurality of piezoelectric elements Eb are disposed on a surface of the vibration plate 18*e* which faces the Z1-direction. Each of the piezoelectric elements Ea and Eb is a passive element deformed by supplying the drive signal. Each of the piezoelectric elements Ea and Eb has an elongated shape extending in the direction along the X-axis in a plan view. The plurality of piezoelectric elements Ea are arranged to correspond to the plurality of pressure chambers Ca in the direction along the Y-axis. The piezoelectric element Ea overlaps the pressure chamber Ca in a plan view. The plurality of piezoelectric elements Eb are arranged to correspond to the plurality of pressure chambers Cb in the direction along the Y-axis. The piezoelectric element Eb overlaps the pressure chamber Cb in a plan view.

Although not illustrated, each of the piezoelectric elements Ea and Eb includes a first electrode, a piezoelectric layer, and a second electrode, and these are stacked in this order in the Z1-direction. One electrode of the first electrode and the second electrode is an individual electrode disposed away from each other for each piezoelectric element Ea or for each piezoelectric element Eb, and a drive signal is applied to the one electrode. The other electrode of the first electrode and the second electrode is a band-shaped common electrode extending in the direction along the Y-axis to be continuous over the plurality of piezoelectric elements Ea or over the plurality of piezoelectric elements Eb, and a predetermined reference potential is supplied to the other electrode. For example, a metal material of the electrodes includes a metal material such as platinum (Pt), aluminum (Al), nickel (Ni), gold (Au), and copper (Cu). Out of the materials, one type can be used alone, or two or more types can be used in combination in an alloyed or stacked aspect. The piezoelectric layer is formed of a piezoelectric material such as lead zirconate titanate ($Pb(Zr, Ti)O_3$). For example, the piezoelectric layer forms a band shape extending in the direction along the Y-axis to be continuous over the plurality of piezoelectric elements Ea or over the plurality of piezoelectric elements Eb. However, the piezoelectric layer may be individually provided for each piezoelectric element Ea or for each piezoelectric element Eb. When the vibration plate 18*e* vibrates in conjunction with deformation of the above-described piezoelectric element Ea, a pressure inside the pressure chamber Ca fluctuates, and the ink is discharged from the nozzle N of the nozzle row La. Similarly, when the vibration plate 18*e* vibrates in conjunction with deformation of the piezoelectric element Eb, the pressure inside the pressure chamber Cb fluctuates, and the ink is discharged from the nozzle N of the nozzle row Lb.

As illustrated in FIG. 6, the cover 18*g* is a plate-shaped member installed on a surface of the vibration plate 18*e* which faces the Z1-direction, protects the plurality of piezoelectric elements Ea and the plurality of piezoelectric elements Eb, and reinforces mechanical strength of the vibration plate 18*e*. Here, the plurality of piezoelectric elements Ea and the plurality of piezoelectric elements Eb are accommodated between the cover 18*g* and the vibration plate 18*e*. For example, the cover 18*g* is formed of a resin material.

As illustrated in FIGS. 5 to 7, the case 18*h* is a case for storing the ink to be supplied to the plurality of pressure chambers Ca and the plurality of pressure chambers Cb. For example, the case 18*h* is formed of a resin material. The case 18*h* is provided with spaces R2*a* and R2*b*, introduction ports Ra_in and Rb_in, and discharge ports Ra_out and Rb_out. The space R2*a* is a space communicating with the above-described space R1*a*, and functions as a liquid storage chamber Ra which is a reservoir for storing the ink to be supplied to the plurality of pressure chambers C together with the space R1*a*. As indicated by an arrow in FIG. 5, the first ink is introduced into the liquid storage chamber Ra via the introduction port Ra_in. The first ink inside the liquid storage chamber Ra flows in the Y2-direction, and is supplied to each pressure chamber Ca via each supply flow path RRa coupled to the liquid storage chamber Ra (FIG. 6). In the first ink flowing through the liquid storage chamber Ra, the first ink that is not supplied to each pressure chamber Ca is discharged via the discharge port Ra_out by an operation of the circulation mechanism 60, as illustrated by an arrow in FIG. 7. Similarly, the space R2*b* is a space communicating with the above-described space R1*b*, and functions as a liquid storage chamber Rb which is a reservoir for storing the ink to be supplied to the plurality of pressure chambers Cb together with the space R1*b*. As indicated by an arrow in FIG. 5, the second ink is introduced into the liquid storage chamber Rb via the introduction port Rb_in. The second ink inside the liquid storage chamber Rb flows in the Y2-direction, and is supplied to each pressure chamber Cb via each supply flow path RRb coupled to the liquid storage chamber Rb (FIG. 6). In the second ink flowing through the liquid storage chamber Rb, the second ink that is not supplied to each pressure chamber Cb is discharged via the discharge port Rb_out by an operation of the circulation mechanism 60, as indicated by an arrow in FIG. 7.

In the present embodiment, as illustrated in FIGS. 5 and 7, the spaces R2*a* and R2*b* are respectively provided in both end portions of the case 18*h* in the direction along the Y-axis. However, as illustrated in FIG. 6, the spaces R2*a* and R2*b* are not provided in a central portion in the direction along the Y-axis of the case 18*h*. The reason is as follows. In the central portion of the case 18*h*, each ink may flow inside each of the liquid storage chambers Ra and Rb_in the Y2-direction as described above, and may reach each of the pressure chambers Ca and Cb, and the ink does not need to flow toward the case 18*h* side Z1 side) with respect to the flow path substrate 18*a*. Instead, in the central portion of the case 18*h*, two wiring holes 18*h*1 penetrating in the direction along the X-axis are provided by utilizing a fact that the spaces R2*a* and R2*b* are not provided. Each of the two wiring holes 18*h*1 is a hole for drawing out the flexible wiring substrate 15 from an end of the head H in the direction along the X-axis. Out of the two wiring holes 18*h*1, one wiring hole 18*h*1 penetrates from the inside to the outside in the X2-direction, and the other wiring hole 18*h*1 penetrates from the inside to the outside in the X1-direction.

The vibration absorber 18*d* is also called a compliance substrate, is a flexible resin film forming wall surfaces of the liquid storage chambers Ra and Rb, and absorbs pressure fluctuations of the ink inside the liquid storage chambers Ra and Rb. The vibration absorber 18*d* may be a flexible thin plate formed of metal. A surface of the vibration absorber 18*d* which faces the Z1-direction is joined to the flow path substrate 18*a* by using an adhesive. On the other hand, a frame body 18*f* is joined to a surface of the vibration absorber 18*d* which faces the Z2-direction by using an adhesive. The frame body 18*f* is a frame-shaped member along an outer periphery of the vibration absorber 18*d*, and comes into contact with the above-described fixing plate 14.

Here, for example, the frame body 18*f* is formed of a metal material such as stainless steel, aluminum, titanium, and a magnesium alloy.

The two flexible wiring substrates 15 are coupled to the head H having the above-described configuration. Here, one end of each of the two flexible wiring substrates 15 extends in the direction along the Y-axis, and is joined to a wire (not illustrated) provided on a surface of the vibration plate 18*e* of the head H which faces the Z1-direction. The wire is electrically coupled to the piezoelectric elements Ea and Eb.

Out of the two flexible wiring substrates 15 coupled to the head H, one flexible wiring substrate 15 is electrically coupled to the piezoelectric element Eb, and is drawn out from an end of the head H in the X1-direction through one wiring hole 18*h*1 of the two wiring holes 18*h*1 described above. Out of the two flexible wiring substrates 15, the other flexible wiring substrate 15 is electrically coupled to the piezoelectric element Ea, and is drawn out from an end of the head H in the X2-direction through the other wiring hole 18*h*1 of the two wiring holes 18*h*1 described above.

When the head H is the first head H_1, the one flexible wiring substrate 15 is the first flexible wiring substrate 15_1, and the other flexible wiring substrate 15 is the second flexible wiring substrate 15_2. In addition, when the head H is the second head H_2, the one flexible wiring substrate 15 is the third flexible wiring substrate 15_3, and the other flexible wiring substrate 15 is the fourth flexible wiring substrate 15_4.

The head H may be configured so that the flexible wiring substrate 15 is drawn out from both ends or the vicinity of the head H in the direction along the X-axis, and may be configured in any desired way without being limited to the examples illustrated in FIGS. 5 to 7. For example, in the examples illustrated in FIGS. 5 to 7, the flexible wiring substrate 15 is drawn out from each of both end surfaces of the head H in the direction along the X-axis. However, the present disclosure is not limited thereto. For example, the flexible wiring substrate 15 may be drawn out from each surface of both end portions of the head H which faces the Z1-direction in the direction along the X-axis.

1-4. Drawing Around Flexible Wiring Substrate

Figure 8:
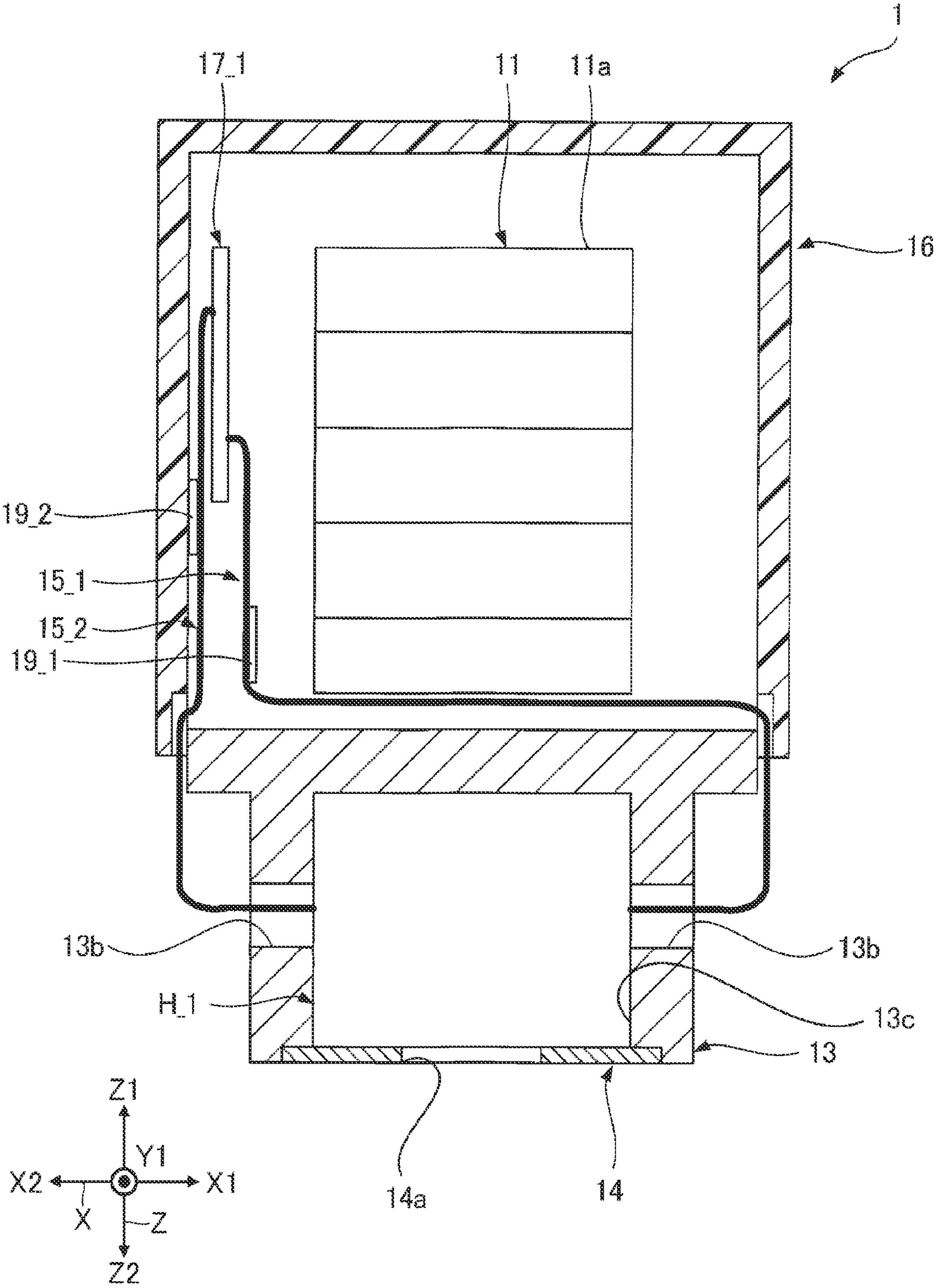
FIG. 8 is a sectional view taken along line VIII-VIII in FIG. 4.

FIG. 8 is a sectional view taken along line VIII-VIII in FIG. 4. As illustrated in FIG. 8, the flow path member 11*a* is disposed at a position in the Z1-direction with respect to the first head H_1. Here, the flow path member 11*a* is disposed inside the cover 16, and the first drive circuit substrate 17_1 is disposed in the direction along the X-axis in a posture where the direction along the X-axis is set as the thickness direction between the surface of the flow path member 11*a* which faces the X2-direction and the cover 16.

The first flexible wiring substrate 15_1 passes between the flow path member 11*a* and the first head H_1 from the first head H_1, and is coupled to the first drive circuit substrate 17_1. In contrast, the second flexible wiring substrate 15_2 is coupled to the first drive circuit substrate 17_1 without passing between the flow path member 11*a* and the first head H_1 from the first head H_1.

Similarly, although not illustrated, the third flexible wiring substrate 15_3 is coupled to the second drive circuit substrate 17_2 without passing between the flow path member 11*a* and the second head H_2 from the second head H_2. In contrast, the fourth flexible wiring substrate 15_4 passes between the flow path member 11*a* and the second head H_2 from the second head H_2, and is coupled to the second drive circuit substrate 17_2. Although not illustrated, the second drive circuit substrate 17_2 is disposed in a posture where the direction along the X-axis is set as the thickness direction between a surface of the flow path member 11*a* which faces the X1-direction and the cover 16.

As described above, since each of the flexible wiring substrates 15 is drawn around, the first drive circuit substrate 17_1 and the first head H_1 can be electrically coupled to each other via the first flexible wiring substrate 15_1 and the second flexible wiring substrate 15_2 in a state where other members such as the flow path member 11*a* are disposed directly above the first head H_1 and the second head H_2, and the second drive circuit substrate 17_2 and the second head H_2 can be electrically coupled to each other via the third flexible wiring substrate 15_3 and the fourth flexible wiring substrate 15_4.

Here, as described above, a portion of the second head H_2 is adjacent to a portion of the first head H_1 at a position in the X1-direction, and the flow path member 11*a* is disposed across a position directly above the first head H_1 and a position directly above the second head H_2. Therefore, the first drive circuit substrate 17_1 needs to be disposed at a position in the X2-direction with respect to at least the center of the first head H_1. Accordingly, it is more preferable that the first drive circuit substrate 17_1 is disposed at a position in the X2-direction with respect to an end portion of the first head H_1 in the X2-direction. Similarly, the second drive circuit substrate 17_2 needs to be disposed at a position in the X1-direction with respect to at least the center of the second head H_2. Accordingly, it is more preferable that the second drive circuit substrate 17_2 is disposed at a position in the X1-direction with respect to an end portion of the second head H_2 in the X1-direction.

Figure 9:
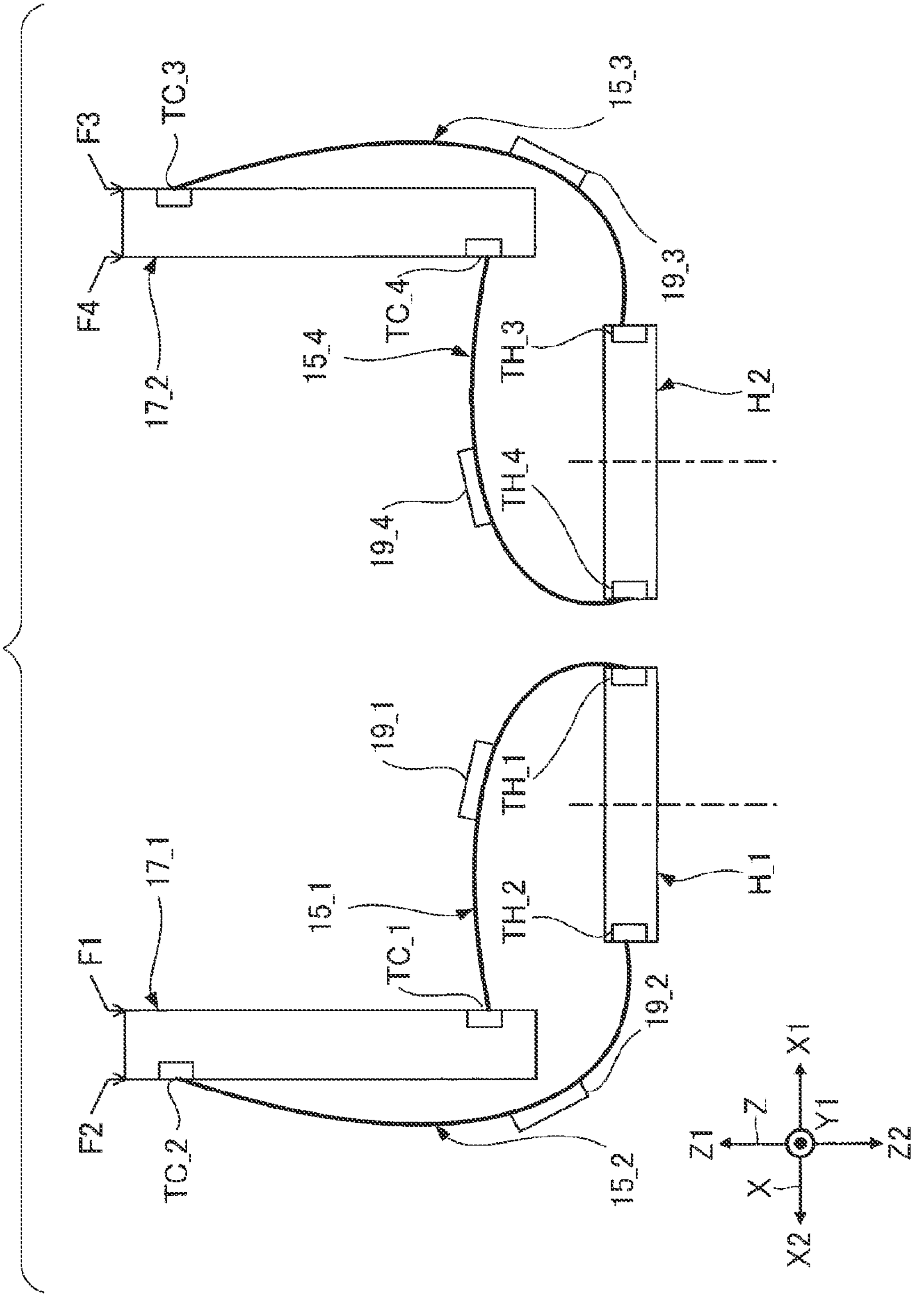
FIG. 9 is a schematic view for describing a disposition of a head, a drive circuit substrate, and a flexible wiring substrate.

FIG. 9 is a schematic view for describing the disposition of the head H, the drive circuit substrate 17, and the flexible wiring substrate 15. For convenience of description, FIG. 9 schematically illustrates the disposition of the first head H_1, the second head H_2, the first drive circuit substrate 17_1, the second drive circuit substrate 17_2, the first flexible wiring substrate 15_1, the second flexible wiring substrate 15_2, the first flexible wiring substrate 15_1, the third flexible wiring substrate 15_3, and the fourth flexible wiring substrate 15_4 when viewed in the Y2-direction. In FIG. 9, the first head H_1 and the second head H_2 are adjacent to each other in the direction along the X-axis. However, as described above, the first head H_1 and the second head H_2 are disposed to be displaced in the direction along the Y-axis. In addition, in FIG. 9, for convenience of description, each portion is schematically illustrated, and dimensions of each portion are appropriately different from actual dimensions.

As illustrated in FIG. 9, the first head H_1 is provided with a first head side terminal TH_1 and a second head side terminal TH_2.

The first head side terminal TH_1 is a terminal provided for each nozzle N of the nozzle row Lb of the first head H_1 and electrically coupled to the piezoelectric element Eb of the first head H_1. One end of the first flexible wiring substrate 15_1 is coupled to the first head side terminal TH_1. The first flexible wiring substrate 15_1 is drawn from an end of the first head H_1 in the X1-direction. In FIG. 9, for convenience of description, the first head side terminal TH_1 is located in the end of the first head H_1 in the X1-direction. However, as long as an aspect is adopted so that the first flexible wiring substrate 15_1 is drawn out from the end or the vicinity of the first head H_1 in the X1-direction, the first head side terminal TH_1 may be located at any desired position.

Here, as described above, the second head H_2 is disposed at a position in the X1-direction with respect to the first head H_1. However, the first head H_1 is disposed to be displaced in the Y1-direction with respect to the second head H_2. Therefore, the first flexible wiring substrate 15_1 can be drawn out from the end of the first head H_1 in the X1-direction.

The second head side terminal TH_2 is a terminal provided for each nozzle N of the nozzle row La of the first head H_1 and electrically coupled to the piezoelectric element Ea of the first head H_1. One end of the second flexible wiring substrate 15_2 is coupled to the second head side terminal TH_2. The second flexible wiring substrate 15_2 is drawn out from the end of the first head H_1 in the X2-direction. In FIG. 9, for convenience of description, the second head side terminal TH_2 is located in the end of the first head H_1 in the X2-direction. However, as long as an aspect is adopted so that the second flexible wiring substrate 15_2 is drawn out from the end or the vicinity of the first head H_1 in the X2-direction, the second head side terminal TH_2 may be located at any desired position.

Here, as described above, the second head H_2 is not disposed at the position in the X2-direction with respect to the first head H_1. Therefore, the second flexible wiring substrate 15_2 can be drawn out from the end of the first head H_1 in the X2-direction without being hindered by the second head H_2.

The first drive circuit 19_1 is disposed on a surface of the first flexible wiring substrate 15_1 which faces the outside, that is, a surface facing a direction away from the first head H_1 out of both surfaces of the first flexible wiring substrate 15_1. On the other hand, the second drive circuit 19_2 is disposed on a surface of the second flexible wiring substrate 15_2 which faces the outside, that is, a surface facing in a direction away from the first head H_1 out of both surfaces of the second flexible wiring substrate 15_2.

On the other hand, the first drive circuit substrate 17_1 is disposed at a position displaced in the X2-direction with respect to the center of the first head H_1, at a position in the Z1-direction with respect to the first head H_1. Here, the first drive circuit substrate 17_1 has a first surface F1 and a second surface F2 as plate surfaces. The first surface F1 is disposed to face the X1-direction, and the second surface F2 is disposed to face the X2-direction. In an example illustrated in FIG. 9, the first drive circuit substrate 17_1 is disposed at a position which does not overlap the first head H_1 when viewed in the direction along the Z-axis. That is, the first drive circuit substrate 17_1 is disposed at a position in the X2-direction with respect to the entire first head H_1.

The first drive circuit substrate 17_1 may be disposed at a position displaced in the X2-direction with respect to the center of the first head H_1, and may overlap the first head H_1 when viewed in the direction along the Z-axis. However, from a viewpoint of sufficiently securing an installation space for the flow path member 11*a*, it is preferable that the first drive circuit substrate 17_1 is disposed at a position which does not overlap the first head H_1 when viewed in the direction along the Z-axis.

The first drive circuit substrate 17_1 is provided with a first circuit side terminal TC_1 and a second circuit side terminal TC_2.

The first circuit side terminal TC_1 is a terminal provided in one end of a wire (not illustrated) that transmits a drive signal for the piezoelectric element Eb in the first drive circuit substrate 17_1. The first circuit side terminal TC_1 is provided on the first surface F1, and the other end of the first flexible wiring substrate 15_1 is coupled to the first circuit side terminal TC_1.

The second circuit side terminal TC_2 is a terminal provided in one end of a wire (not illustrated) that transmits a drive signal for the piezoelectric element Ea in the first drive circuit substrate 17_1. The second circuit side terminal TC_2 is provided on the second surface F2, and the other end of the second flexible wiring substrate 15_2 is coupled to the second circuit side terminal TC_2.

In the first drive circuit substrate 17_1, the first circuit side terminal TC_1 is disposed at a position in the Z2-direction with respect to the second circuit side terminal TC_2. In the example illustrated in FIG. 9, whereas the first circuit side terminal TC_1 is disposed at a position in the Z2-direction with respect to the center of the first drive circuit substrate 17_1 in the direction along the Z-axis, the second circuit side terminal TC_2 is disposed at a position in the Z1-direction with respect to the center of the first drive circuit substrate 17_1 in the direction along the Z-axis.

The second head H_2 and related elements are configured as in the first head H_1 and related elements which are described above.

Specifically, the second head H_2 is provided with a third head side terminal TH_3 and a fourth head side terminal TH_4.

The third head side terminal TH_3 is a terminal provided for each nozzle N of the nozzle row Lb of the second head H_2 and electrically coupled to the piezoelectric element Eb of the second head H_2. One end of the third flexible wiring substrate 15_3 is coupled to the third head side terminal TH_3. The third flexible wiring substrate 15_3 is drawn out from an end of the second head H_2 in the X1-direction. In FIG. 9, for convenience of description, the third head side terminal TH_3 is located in the end of the second head H_2 in the X1-direction. However, as long as an aspect is adopted so that the third flexible wiring substrate 15_3 is drawn out from the end or the vicinity of the second head H_2 in the X1-direction, the third head side terminal TH_3 may be located at any desired position.

Here, as described above, the first head H_1 is not disposed at a position in the X1-direction with respect to the second head H_2. Therefore, the third flexible wiring substrate 15_3 can be drawn out from the end of the second head H_2 in the X1-direction without being hindered by the first head H_1.

The fourth head side terminal TH_4 is a terminal provided for each nozzle N of the nozzle row La of the second head H_2 and electrically coupled to the piezoelectric element Ea of the second head H_2. One end of the fourth flexible wiring substrate 15_4 is coupled to the fourth head side terminal TH_4. The fourth flexible wiring substrate 15_4 is drawn out from an end of the second head H_2 in the X2-direction. In addition, in FIG. 9, for convenience of description, the fourth head side terminal TH_4 is located in the end of the second head H_2 in the X2-direction. However, as long as an aspect is adopted so that the fourth flexible wiring substrate 15_4 is drawn out from the end of the second head H_2 in the X2-direction, the fourth head side terminal TH_4 may be located at any desired position.

Here, as described above, the first head H_1 is disposed at a position in the X2-direction with respect to the second head H_2. However, the second head H_2 is disposed to be displaced in the Y2-direction with respect to the first head H_1. Therefore, the fourth flexible wiring substrate 15_4 can be drawn out from the end of the second head H_2 in the X2-direction.

The third drive circuit 19_3 is disposed on a surface of the third flexible wiring substrate 15_3 which faces the outside, that is, a surface facing in a direction away from the second head H_2 out of both surfaces of the third flexible wiring substrate 15_3. On the other hand, the fourth drive circuit 19_4 is disposed on a surface of the fourth flexible wiring substrate 15_4 which faces the outside, that is, a surface facing in a direction away from the second head H_2 out of both surfaces of the fourth flexible wiring substrate 15_4.

On the other hand, the second drive circuit substrate 17_2 is disposed a position displaced in the X1-direction with respect to the center of the second head H_2, at a position in the Z1-direction with respect to the second head H_2. Here, the second drive circuit substrate 17_2 has a third surface F3 and a fourth surface F4 as plate surfaces, the third surface F3 is disposed to face the X1-direction, and the fourth surface F4 is disposed to face the X2-direction. In the example illustrated in FIG. 9, the second drive circuit substrate 17_2 is disposed at a position which does not overlap the second head H_2 when viewed in the direction along the Z-axis. That is, the second drive circuit substrate 17_2 is disposed at a position in the X1-direction with respect to the entire second head H_2.

The second drive circuit substrate 17_2 may overlap the second head H_2 when viewed in the direction along the Z-axis, as long as the second drive circuit substrate 17_2 is disposed at a position displaced in the X1-direction with respect to the center of the second head H_2. However, from a viewpoint of sufficiently securing an installation space for the flow path member 11*a*, it is preferable that the second drive circuit substrate 17_2 is disposed at a position which does not overlap the second head H_2 when viewed in the direction along the Z-axis.

The second drive circuit substrate 17_2 is provided with a third circuit side terminal TC_3 and a fourth circuit side terminal TC_4.

The third circuit side terminal TC_3 is a terminal provided in one end of a wire (not illustrated) that transmits a drive signal for the piezoelectric element Eb in the second drive circuit substrate 17_2. The third circuit side terminal TC_3 is provided on the third surface F3, and the other end of the third flexible wiring substrate 15_3 is coupled to the third circuit side terminal TC_3.

The fourth circuit side terminal TC_4 is a terminal provided in one end of a wire (not illustrated) that transmits a drive signal for the piezoelectric element Ea in the second drive circuit substrate 17_2. The fourth circuit side terminal TC_4 is provided on the fourth surface F4, and the other end of the fourth flexible wiring substrate 15_4 is coupled to the fourth circuit side terminal TC_4.

In the second drive circuit substrate 17_2, the fourth circuit side terminal TC_4 is disposed at a position in the Z2-direction with respect to the third circuit side terminal TC_3. In the example illustrated in FIG. 9, whereas the third circuit side terminal TC_3 is disposed at a position in the Z1-direction with respect to the center of the second drive circuit substrate 17_2 in the direction along the Z-axis, the fourth circuit side terminal TC_4 is disposed at a position in the Z2-direction with respect to the center of the second drive circuit substrate 17_2 in the direction along the Z-axis.

Figure 10:
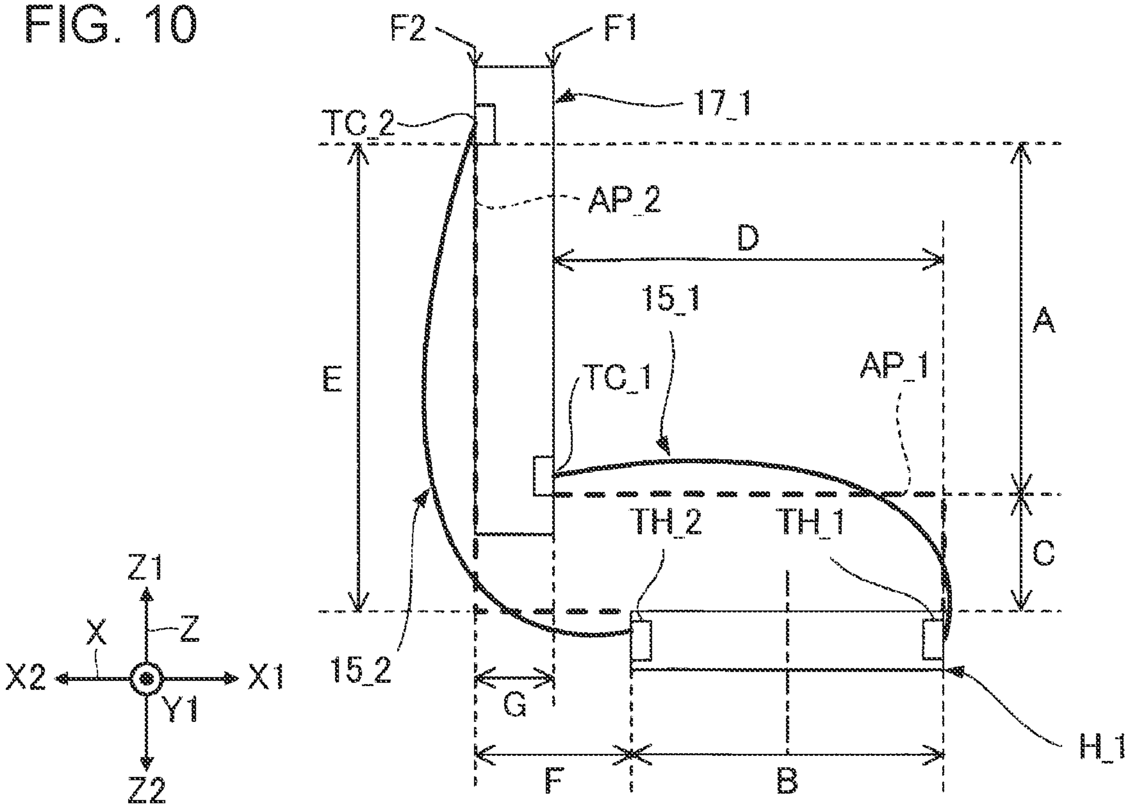
FIG. 10 is a schematic view for describing a disposition of a first circuit side terminal and a second circuit side terminal.

FIG. 10 is a schematic view for describing the disposition of the first circuit side terminal TC_1 and the second circuit side terminal TC_2. In FIG. 10, for convenience of description, the first drive circuit 19_1, the second drive circuit 19_2, the third drive circuit 19_3, and the fourth drive circuit 19_4 are omitted in the illustration.

Hereinafter, the disposition of the first circuit side terminal TC_1 and the second circuit side terminal TC_2 will be described as a representative example. The disposition of the third circuit side terminal TC_3 and the fourth circuit side terminal TC_4 is the same as the disposition of the first circuit side terminal TC_1 and the second circuit side terminal TC_2, except that both are symmetrical in the direction along the X-axis when viewed in the direction along the Y-axis.

When a distance along the Z-axis between the first head side terminal TH_1 and the first circuit side terminal TC_1 is defined as C, a distance along the X-axis between the first head side terminal TH_1 and the first circuit side terminal TC_1 is defined as D, a bending amount of the first flexible wiring substrate 15_1 with respect to a broken line AP_1 is defined as $\alpha$, the length of the first flexible wiring substrate 15_1 is approximated by $(C+D+\alpha)$. Here, the broken line AP_1 is a line that connecting the first head side terminal TH_1 and the first circuit side terminal TC_1 when viewed in the direction along the Y-axis, and includes a line segment extending in the direction along the Z-axis with the length equal to the distance C and a line segment extending along the X-axis with the length equal to the distance D.

Similarly, when a distance along the Z-axis between the second head side terminal TH_2 and the second circuit side terminal TC_2 is defined as E, a distance along the X-axis between the second head side terminal TH_2 and the second circuit side terminal TC_2 is defined as F, and a bending amount of the second flexible wiring substrate 15_2 with respect to a broken line AP_2 is defined as $\beta$, the length of the second flexible wiring substrate 15_2 is approximated by $(E+F+\beta)$. Here, the broken line AP_2 is a line that connects the second head side terminal TH_2 and the second circuit side terminal TC_2 when viewed in the direction along the Y-axis, and includes a line segment extending in the direction along the Z-axis with the length equal to the distance E and a line segment extending along the X-axis with the length equal to the distance F.

Here, as the first flexible wiring substrate 15_1 and the second flexible wiring substrate 15_2, the flexible wiring substrates having mutually different configurations may be used. However, from a viewpoint of cost reduction, it is preferable to use the flexible wiring substrates having the mutually same configuration. In this case, the length of the first flexible wiring substrate 15_1 and the length of the second flexible wiring substrate 15_2 are equal to each other. In contrast, when the length of the first flexible wiring substrate 15_1 and the length of the second flexible wiring substrate 15_2 are different from each other, even when a disadvantage (to be described later) caused by a bending difference between these substrates can be eliminated, the number of components to be managed increases. Therefore, this configuration results in higher costs.

When the length of the first flexible wiring substrate 15_1 and the length of the second flexible wiring substrate 15_2 are equal to each other, a first relationship of $(C+D+\alpha)=(E+F+\beta)$ is satisfied. Therefore, in this case, the bending difference $(\beta-\alpha)$ that is the difference between the bending amount $\alpha$ of the first flexible wiring substrate 15_1 and the bending amount $\beta$ of the second flexible wiring substrate 15_2 is approximated by $[(C+D)-(E+F)]$.

The bending difference $(\beta-\alpha)$ may be a positive value or a negative value in some cases. When the bending difference $(\beta-\alpha)$ is the positive value, the bending amount $\beta$ of the second flexible wiring substrate 15_2 is larger than the bending amount $\alpha$ of the first flexible wiring substrate 15_1. When the bending difference $(\beta-\alpha)$ is the negative value, the bending amount $\alpha$ of the first flexible wiring substrate 15_1 is larger than the bending amount $\beta$ of the second flexible wiring substrate 15_2.

In addition, since the positions of the first head side terminal TH_1 and the second head side terminal TH_2 in the direction along the Z-axis are equal to each other, when the distance along the Z-axis between the first circuit side terminal TC_1 and the second circuit side terminal TC_2 is defined as A, a second relationship of C=E−A is satisfied.

Furthermore, when the thickness of the first drive circuit substrate 17_1 along the X-axis is defined as G, and the width of the first head H_1 in the direction along the X-axis is defined as B, a relationship of D=B+F−G is satisfied. Here, since the thickness G is extremely smaller than the width B, a third relationship of D≅B+F is satisfied. The third relationship is established when the thickness G is smaller than 1/10 times the width B.

In an example illustrated in FIG. 10, the first head side terminal TH_1 is disposed in the end of the first head H_1 in the X1-direction, and the second head side terminal TH_2 is disposed in the end of the first head H_1 in the X2-direction. Therefore, the width B is equal to the distance between the first head side terminal TH_1 and the second head side terminal TH_2 in the direction along the X-axis.

Based on the first, second, and third relationships described above, a fourth relationship of (β−α)=(B−A) is obtained.

Figure 11:
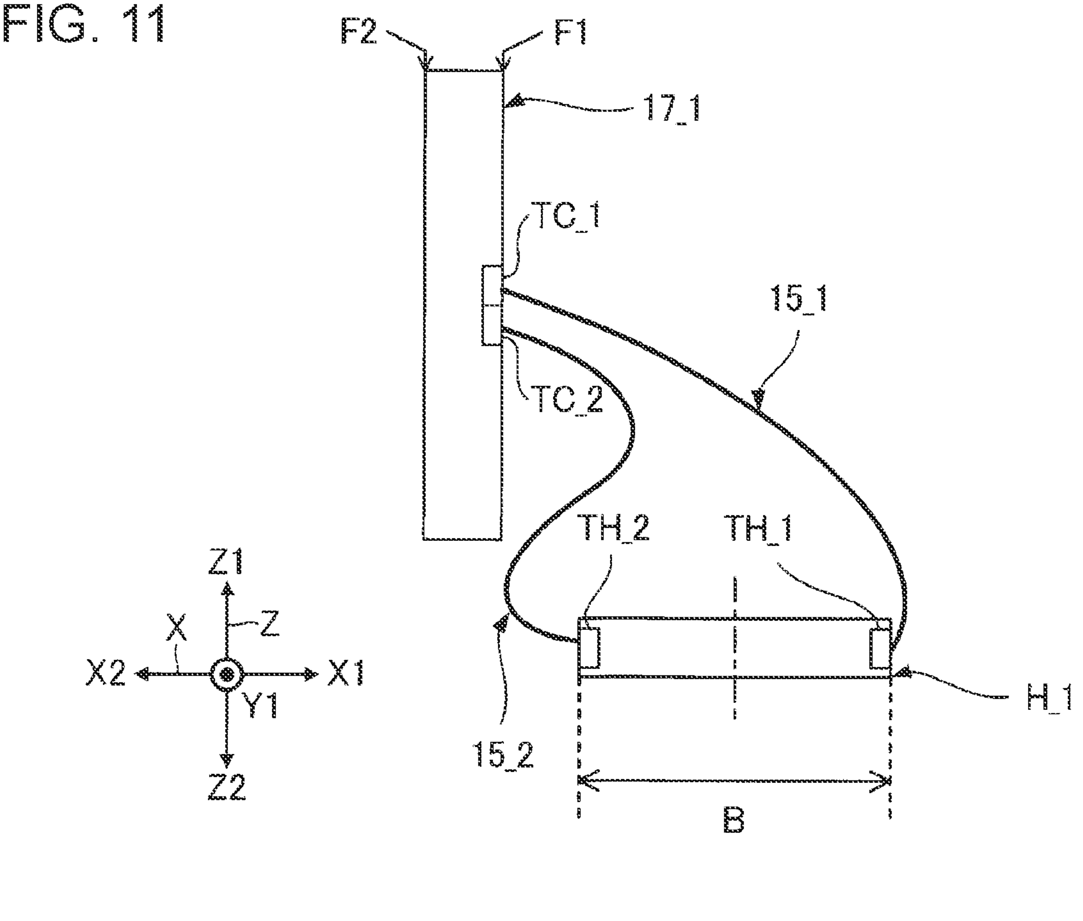
FIG. 11 is a view for describing a case where both the first circuit side terminal and the second circuit side terminal are provided on a first surface of the drive circuit substrate.

FIG. 11 is a view for describing a case where both the first circuit side terminal TC_1 and the second circuit side terminal TC_2 are provided on the first surface F1 of the first drive circuit substrate 17_1. As illustrated in FIG. 11, in this case, as long as the positions of these terminals are not displaced in the direction along the Y-axis, the second circuit side terminal TC_2 cannot be disposed at a position in the Z1-direction with respect to the first circuit side terminal TC_1. Since these terminals are disposed at the same position in the Z-direction at the position displaced in the Y-direction on the first surface F1, the width of each terminal in the Y-direction, that is, the width of a coupling region to each flexible wiring substrate in the Y-direction of the flexible wiring substrate is consequently shortened. Therefore, physical constraints are imposed on the flexible wiring substrate, thereby resulting in such an adverse effect that the width of the first drive circuit substrate 17_1 in the Y-direction increases.

Here, the first drive circuit substrate 17_1 is disposed at a position in the X2-direction with respect to the first head H_1. Therefore, although a space for disposing the flow path member 11*a* directly above the first head H_1 can be formed, the distance between the second head side terminal TH_2 and the second circuit side terminal TC_2 is shorter than the distance between the first head side terminal TH_1 and the first circuit side terminal TC_1. Therefore, when the lengths of these substrates are equal to each other, even when the position of the first circuit side terminal TC_1 is set so that the bending amount α of the first flexible wiring substrate 15_1 is proper, the second flexible wiring substrate 15_2 is suddenly bent. Consequently, coupling reliability of the second flexible wiring substrate 15_2 is lowered. When the second circuit side terminal TC_2 is disposed in the Z1-direction with respect to the first circuit side terminal TC_1, the distance between the second head side terminal TH_2 and the second circuit side terminal TC_2 and the distance between the first head side terminal TH_1 and the first circuit side terminal TC_1 have a difference closer to 0. However, in that case, the second flexible wiring substrate 15_2 needs to be physically disposed across (over) the first flexible wiring substrate 15_1. Therefore, this configuration cannot be practical.

Figure 12:
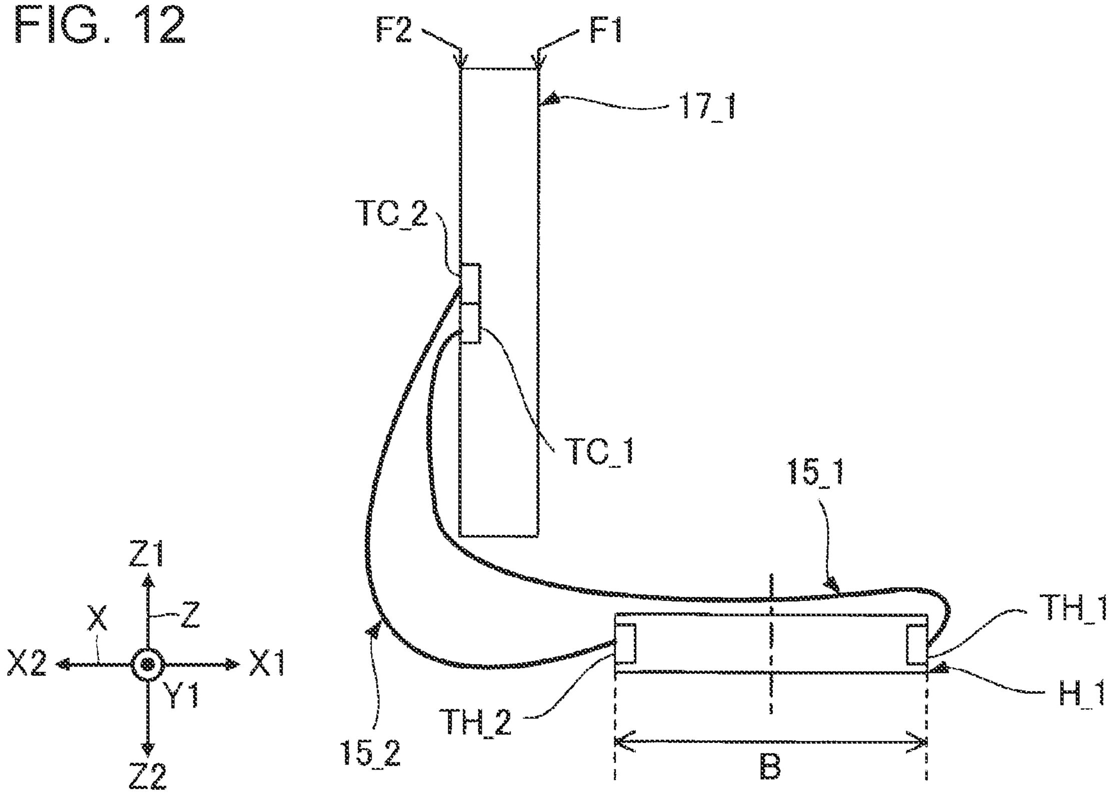
FIG. 12 is a view for describing a case where both the first circuit side terminal and the second circuit side terminal are provided on a second surface of the drive circuit substrate.

FIG. 12 is a view for describing a case where both the first circuit side terminal TC_1 and the second circuit side terminal TC_2 are provided on the second surface F2 of the first drive circuit substrate 17_1. As illustrated in FIG. 12, in this case, as long as the positions of these terminals are not displaced in the direction along the Y-axis, the first circuit side terminal TC_1 cannot be disposed at a position in the Z1-direction with respect to the second circuit side terminal TC_2.

Here, as described above, the distance between the second head side terminal TH_2 and the second circuit side terminal TC_2 is shorter than the distance between the first head side terminal TH_1 and the first circuit side terminal TC_1. Therefore, when the lengths of these substrates are equal to each other, even when the position of the second circuit side terminal TC_2 is set so that the bending amount β of the second flexible wiring substrate 15_2 is proper, the first flexible wiring substrate 15_1 is suddenly bent. Consequently, coupling reliability of the first flexible wiring substrate 15_1 is lowered. Moreover, in this case, the first flexible wiring substrate 15_1 needs to be coupled to the second surface F2 after passing through a position in the Z2-direction with respect to the first drive circuit substrate 17_1. Consequently, the first flexible wiring substrate 15_1 is likely to be suddenly bent. Disposing the first circuit side terminal TC_1 in the Z1-direction with respect to the second circuit side terminal TC_2 is not the practical configuration for the same reason as described with reference to FIG. 11.

Therefore, in the liquid discharge apparatus 100, as described above, the first circuit side terminal TC_1 is provided on the first surface F1 of the first drive circuit substrate 17_1, and the second circuit side terminal TC_2 is provided on the second surface F2 of the first drive circuit substrate 17_1. In this manner, even when the positions of these terminals are displaced in the direction along the Y-axis, the first circuit side terminal TC_1 can be disposed at a position in the Z1-direction with respect to the second circuit side terminal TC_2.

Figure 13:
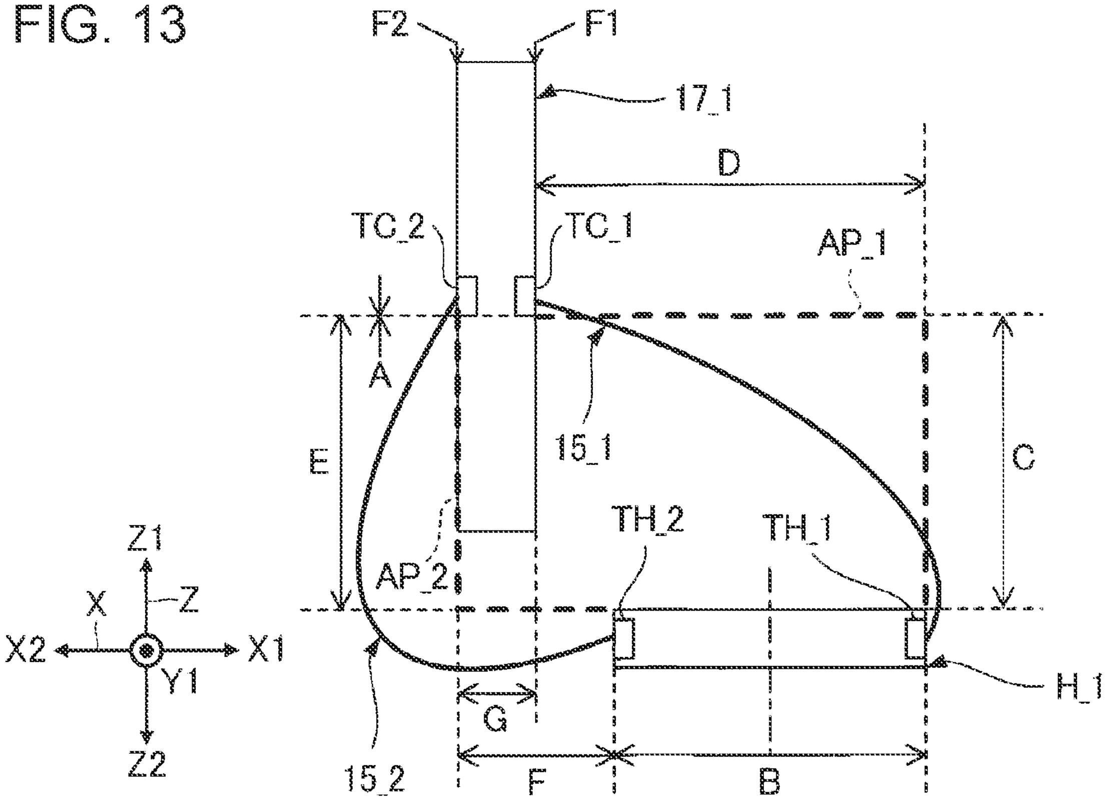
FIG. 13 is a schematic view for describing a disposition of a first circuit side terminal and a second circuit side terminal in a reference example.

FIG. 13 is a schematic view for describing the disposition of the first circuit side terminal TC_1 and the second circuit side terminal TC_2 in a reference example. The reference example illustrated in FIG. 13 has a configuration the same as that illustrated in FIG. 10 described above, except that the positions of the first circuit side terminal TC_1 and the second circuit side terminal TC_2 in the direction along the Z-axis are equal to each other.

In this reference example, the first flexible wiring substrate 15_1 does not need to be coupled to the second surface F2 after passing through a position in the Z2-direction with respect to the first drive circuit substrate 17_1. Therefore, a possibility that the first flexible wiring substrate 15_1 is suddenly bent as illustrated in FIG. 12 described above can be eliminated.

However, in the reference example, when the lengths of these substrates are equal to each other, even when the position of the first circuit side terminal TC_1 is set so that the bending amount α of the first flexible wiring substrate 15_1 is proper, as in the case illustrated in FIG. 11 described above, the second flexible wiring substrate 15_2 is suddenly bent. Consequently, coupling reliability of the second flexible wiring substrate 15_2 is lowered.

Here, in the reference example, since the distance A is zero, the bending difference (β−α) is equal to the width B, based on the fourth relationship described above. That is, in the reference example, the bending amount β of the second flexible wiring substrate 15_2 is larger than the bending amount $\alpha$ of the first flexible wiring substrate 15_1 by the amount equal to the width B.

Therefore, in the liquid discharge apparatus 100, the relationship of $(\beta-\alpha)<B$ is satisfied by disposing the first circuit side terminal TC_1 at a position in the Z1-direction with respect to the second circuit side terminal TC_2. Since this relationship is satisfied, the bending amount $\beta$ of the second flexible wiring substrate 15_2 is smaller than that of the above-described reference example in which the relationship of $(\beta-\alpha)=B$ is satisfied as described above. Therefore, it is possible to prevent a possibility that the coupling reliability is lowered due to the sudden bending of the second flexible wiring substrate 15_2.

However, as the distance A along the Z-axis between the first circuit side terminal TC_1 and the second circuit side terminal TC_2 increases, the bending difference $(\beta-\alpha)$ becomes a negative value, based on the fourth relationship described above. The bending amount $\alpha$ of the first flexible wiring substrate 15_1 becomes larger than the bending amount $\beta$ of the second flexible wiring substrate 15_2. When $A=2\times B$ is satisfied, the bending amount $\alpha$ of the first flexible wiring substrate 15_1 exceeds an allowable range. The reason is as follows. When $A=2\times B$ is satisfied, $(\beta-\alpha)=-B$ is satisfied. Therefore, the bending amount $\alpha$ of the first flexible wiring substrate 15_1 becomes approximately the same as the bending amount $\beta$ of the second flexible wiring substrate 15_2 in the above-described reference example.

Therefore, in order to prevent a possibility that the reliability is lowered due to the sudden bending of both the first flexible wiring substrate 15_1 and the second flexible wiring substrate 15_2, a relationship of $A<2\times B$ needs to be satisfied. Therefore, it is preferable that the relationship of $A<2\times B$ is satisfied.

In addition, as the bending difference $(\beta-\alpha)$ is closer to zero, that is, as the distance A is closer to the width B, a problem that the reliability is lowered due to the sudden bending of both the first flexible wiring substrate 15_1 and the second flexible wiring substrate 15_2 is less likely to arise. Therefore, it is more preferable that a relationship of $(1/2)\times B<A<(3/2)\times B$ is satisfied.

However, the first flexible wiring substrate 15_1 passes between the first head H_1 and the flow path member 11*a*. Therefore, when the bending is large, compared to the second flexible wiring substrate 15_2, there is a higher disconnection risk caused by contact with the first head H_1 or the flow path member 11*a*. Therefore, from a viewpoint of reducing the disconnection risk, it is preferable that the bending amount $\alpha$ of the first flexible wiring substrate 15_1 is smaller than the bending amount $\beta$ of the second flexible wiring substrate 15_2. In other words, based on the fourth relationship described above, it is preferable that the width B is larger than the distance A, that is, the relationship of $A<B$ is satisfied. Based on the above-described configuration, from a viewpoint of improving the reliability of the liquid discharge apparatus 100, it is most preferable that a relationship of $(1/2)\times B<A<B$ is satisfied.

Here, the length $(C+D+\alpha)$ of the first flexible wiring substrate 15_1 needs to be larger than the distance $(C^2+D^2)^{1/2}$ between the first head side terminal TH_1 and the first circuit side terminal TC_1. Therefore, a relationship of $(C^2+D^2)^{1/2}<(C+D+\alpha)$ is satisfied. However, from a viewpoint of reducing the bending amount $\alpha$, it is preferable that a relationship of $(C+D+\alpha)<2\times(C^2+D^2)^{1/2}$ is satisfied. Therefore, it is preferable that $(C^2+D^2)^{1/2}<(C+D+\alpha)<2\times(C^2+D^2)^{1/2}$ is satisfied. From the same viewpoint, it is preferable that $(E^2+F^2)^{1/2}<(E+F+\beta)<2\times(E^2+F^2)^{1/2}$ is satisfied.

In addition, from a viewpoint of cost reduction, it is preferable that the length $(C+D+\alpha)$ of the first flexible wiring substrate 15_1 and the length $(E+F+\beta)$ of the second flexible wiring substrate 15_2 are equal to each other. Specifically, it is preferable that $0.9<(C+D+\alpha)/(E+F+\beta)<1.1$ is satisfied. In particular, from the viewpoint of cost reduction, it is most preferable that the first flexible wiring substrate 15_1 and the second flexible wiring substrate 15_2 have the same configuration.

Furthermore, from a viewpoint of reducing the size of the head unit 1 and disposing the first drive circuit substrate 17_1 and the second drive circuit substrate 17_2 between the flow path member 11*a* and the cover 16, it is preferable that a relationship of $A<(E+C)/2<B$ and a relationship of $A<(F+D)/2<B$ are satisfied.

As described above, the liquid discharge apparatus 100 includes the head unit 1, the first drive circuit substrate 17_1, the first flexible wiring substrate 15_1, and the second flexible wiring substrate. The head unit 1 includes the first head H_1, the second head H_2, and the fixing portion PF.

The first head H_1 includes the piezoelectric element Eb that is an example of the "first piezoelectric element", the first head side terminal TH_1 electrically coupled to the piezoelectric element Eb, the piezoelectric element Ea that is an example of the "second piezoelectric element", and the second head side terminal TH_2 electrically coupled to the piezoelectric element Ea. A portion of the second head H_2 overlaps the first head H_1 when viewed in the direction along the X-axis, and the other portion does not overlap the first head H_1. When viewed in the direction along the Y-axis orthogonal to the direction along the X-axis, the second head H_2 is located at a position which does not overlap the first head H_1. A direction along the Z-axis is an example of the "first direction". A direction along the Y-axis is an example of the "second direction". The first head H_1 and the second head H_2 are fixed to the fixing portion PF.

The first drive circuit substrate 17_1 is provided with the first circuit side terminal TC_1 and the second circuit side terminal TC_2. One end of the first flexible wiring substrate 15_1 is coupled to the first head side terminal TH_1, the other end of the first flexible wiring substrate 15_1 is coupled to the first circuit side terminal TC_1, and the first flexible wiring substrate 15_1 is drawn out from a position of the first head H_1 in the X1-direction. The X1-direction is an example of "one side in the first direction". One end of the second flexible wiring substrate 15_2 is coupled to the second head side terminal TH_2, the other end of the second flexible wiring substrate 15_2 is coupled to the second circuit side terminal TC_2, and the second flexible wiring substrate 15_2 is drawn out from a position of the first head H_1 in the X2-direction. The X2-direction is an example of the "other side in the first direction".

The first drive circuit substrate 17_1 is provided at a position displaced in the X2-direction with respect to the center of the first head H_1 in the direction along the X-axis. The first circuit side terminal TC_1 is provided on the first surface F1 of the first drive circuit substrate 17_1 which faces the X1-direction. The second circuit side terminal TC_2 is provided on the second surface F2 of the first drive circuit substrate 17_1 which faces the X2-direction.

The first circuit side terminal TC_1 is provided at a position in the Z2-direction with respect to the second circuit side terminal TC_2. The Z2-direction is an example of a "predetermined side", and is a side on which the first head H_1 is viewed from the first drive circuit substrate 17_1 along the direction along the Z-axis. A direction along the Z-axis is an example of a "third direction orthogonal to both the first direction and the second direction".

In the liquid discharge apparatus 100 described above, the first drive circuit substrate 17_1 is provided at a position displaced in the X2-direction with respect to the center of the first head H_1 in the direction along the X-axis. Therefore, the flow path member 11*a* for supplying the ink to the first head H_1 or other members can be disposed to overlap the first head H_1 at a position in the Z1-direction with respect to the first head H_1.

In addition, the first circuit side terminal TC_1 is provided on the first surface F1 which faces the X1-direction, and the second circuit side terminal TC_2 is provided on the second surface F2 which faces the X2-direction. Therefore, with a simple configuration, the first circuit side terminal TC_1 and the second circuit side terminal TC_2 can be located at mutually different positions in the Z2-direction.

Moreover, the first circuit side terminal TC_1 is disposed at a position in the Z2-direction with respect to the second circuit side terminal TC_2. Therefore, even when the lengths of the first flexible wiring substrate 15_1 and the second flexible wiring substrate 15_2 are equal to each other, the bending difference ($\alpha-\beta$) of the flexible wiring substrate can be reduced. In this manner, the bending amount $\beta$ of the second flexible wiring substrate 15_2 becomes smaller compared to an aspect in which the first circuit side terminal TC_1 and the second circuit side terminal TC_2 are disposed at the same position in the Z2-direction. Therefore, a possibility that the coupling reliability is lowered due to the sudden bending of the second flexible wiring substrate 15_2 can be prevented. As a result, the reliability of the liquid discharge apparatus 100 can be secured, and the cost can be reduced.

In the present embodiment, as described above, when the distance between the first circuit side terminal TC_1 and the second circuit side terminal TC_2 in the direction along the Z-axis is defined as A, and the width of the first head H_1 in the direction along the X-axis is defined as B, it is preferable that the relationship of $A<2\times B$ is satisfied. When this relationship is satisfied, a possibility that the coupling reliability is lowered in both the first flexible wiring substrate 15_1 and the second flexible wiring substrate 15_2 can be prevented.

Here, as described above, when the relationship of $(1/2)\times B<A<(3/2)\times B$ is satisfied, it is possible to preferably adopt a configuration in which the reliability is less likely to be lowered due to the sudden bending of both the first flexible wiring substrate 15_1 and the second flexible wiring substrate 15_2.

In addition, as described above, when the relationship of $A<B$ is satisfied, even when the first flexible wiring substrate 15_1 passes between the first head H_1 and the other member such as the flow path member, the risk that the reliability is lowered due to contact of the first flexible wiring substrate 15_1 with the first head H_1 and the other member can be reduced.

Furthermore, as described above, when the relationship of $(1/2)\times B<A<B$ is satisfied, it is possible to most preferably adopt the configuration in which the reliability is less likely to be lowered due to the sudden bending of both the first flexible wiring substrate 15_1 and the second flexible wiring substrate 15_2.

In addition, as described above, the first circuit side terminal TC_1 is disposed at a position in the Z2-direction with respect to the center of the first drive circuit substrate 17_1 in the direction along the Z-axis. In contrast, the second circuit side terminal TC_2 is disposed at a position in the Z1-direction with respect to the center of the first drive circuit substrate 17_1 in the direction along the Z-axis. Therefore, the width of the first drive circuit substrate 17_1 in the direction along the Z-axis can be minimized, and the distance A in the direction along the Z-axis between the first circuit side terminal TC_1 and the second circuit side terminal TC_2 can be increased.

Furthermore, as described above, the thickness G of the first drive circuit substrate 17_1 in the direction along the X-axis is smaller than 1/10 times the width B of the first head H_1 in the direction along the X-axis. More specifically, the thickness G is smaller than 1/10 times the length between the first head side terminal TH_1 and the second head side terminal TH_2 in the direction along the X-axis. In this case, the thickness G of the first drive circuit substrate 17_1 is sufficiently thin. Therefore, a space for installing the other member such as the flow path member 11*a* is secured on the first head H_1, and an advantageous effect of reducing the bending difference between the first flexible wiring substrate 15_1 and the second flexible wiring substrate 15_2 can be preferably obtained.

In addition, as described above, the liquid discharge apparatus 100 includes the second drive circuit substrate 17_2, the third flexible wiring substrate 15_3, and the fourth flexible wiring substrate 15_4. The second drive circuit substrate 17_2 is provided with the third circuit side terminal TC_3 and the fourth circuit side terminal TC_4. One end of the third flexible wiring substrate 15_3 is coupled to the third head side terminal TH_3 provided in the second head H_2, and the other end of the third flexible wiring substrate 15_3 is coupled to the third circuit side terminal TC_3. The third flexible wiring substrate 15_3 is drawn out from the position of the second head H_2 in the X1-direction. One end of the fourth flexible wiring substrate 15_4 is coupled to the fourth head side terminal TH_4 provided in the second head H_2, and the other end of the fourth flexible wiring substrate 15_4 is coupled to the fourth circuit side terminal TC_4. The fourth flexible wiring substrate 15_4 is drawn out from the position of the first head H_1 in the X2-direction.

The second drive circuit substrate 17_2 is provided at a position displaced in the X1-direction with respect to the center of the second head H_2 in the direction along the X-axis. The third circuit side terminal TC_3 is provided on the third surface F3 of the second drive circuit substrate 17_2 which faces the X1-direction. The fourth circuit side terminal TC_4 is provided on the fourth surface F4 of the second drive circuit substrate 17_2 which faces the X2-direction. The fourth circuit side terminal TC_4 is provided at a position in the Z2-direction of the second drive circuit substrate 17_2 with respect to the third circuit side terminal TC_3.

In this way, in the configuration including the second drive circuit substrate 17_2, the third flexible wiring substrate 15_3, and the fourth flexible wiring substrate 15_4, the same advantageous effect as that of the configuration including the first drive circuit substrate 17_1, the first flexible wiring substrate 15_1, and the second flexible wiring substrate 15_2 can also be obtained. That is, even when the second drive circuit substrate 17_2 is disposed at a position in the Z1-direction with respect to the second head H_2, the flow path member 11*a* or the other member for supplying the ink to the second head H_2 can be disposed to overlap the second head H_2 at a position in the Z1-direction with respect to the second head H_2. In addition, even when the lengths of the third flexible wiring substrate 15_3 and the fourth flexible wiring substrate 15_4 are equal to each other, the bending difference between these flexible wiring substrates can be reduced. Therefore, the reliability of the liquid discharge apparatus 100 can be secured, and the cost can be reduced.

Furthermore, as described above, the head unit 1 includes the first portion PA1, the second portion PA2, and the third portion PA3. The first portion PA1 includes a portion of the first head H_1 and a portion of the second head H_2. The second portion PA2 includes the other portion of the first head H_1 without including the second head H_2, and the width W2 of the second portion PA2 along the X-axis is shorter than the width W1 of the first portion PA1 along the X-axis. The third portion PA3 includes the other portion of the second head H_2 without including the first head H_1, and the width W3 of the third portion PA3 along the X-axis is shorter than the width W1 of the first portion PA1 along the X-axis. In this head unit 1, the first drive circuit substrate 17_1 needs to be disposed at a position displaced in the X2-direction with respect to the center of the first head H_1, and the second drive circuit substrate 17_2 needs to be disposed at a position displaced with respect to the center of the second head H_2 in the X1-direction.

In addition, as described above, the fixing portion PF includes the holder 13 and the fixing plate 14. The holder 13 holds the first head H_1 and the second head H_2. The fixing plate 14 fixes the first head H_1 and the second head H_2 to the holder 13 in common. In this fixing portion PF, the positions of the first head H_1 and the second head H_2 in the direction orthogonal to the Z-axis and postures around the Z-axis can be restricted by the holder 13, and the positions of the first head H_1 and the second head H_2 in the direction along the Z-axis can be restricted by the fixing plate 14.

Furthermore, as described above, the liquid discharge apparatus 100 further includes the flow path member 11*a*. The flow path member 11*a* is a member disposed at a position in the Z1-direction with respect to the first head H_1 and the second head H_2 to supply the ink to the first head H_1 and the second head H_2. Therefore, the size of the head unit 1 can be reduced, and the flow path member 11*a* can be incorporated into the head unit 1. The flow path member 11*a* may be divided for each head H. That is, the flow path member 11*a* may be configured to include a first flow path member for supplying the ink to the first head H_1 and a second flow path member for supplying the ink to the second head H_2.

In addition, as described above, the first flexible wiring substrate 15_1 passes between the first head H_1 and the flow path member 11*a*. On the other hand, the second flexible wiring substrate 15_2 does not pass between the second head H_2 and the flow path member 11*a*. In this configuration, an advantageous effect of satisfying the above-described relationship between the distance A and the width B can be preferably obtained.

Furthermore, as described above, the first drive circuit substrate 17_1 is disposed at a position which does not overlap the first head H_1 when viewed in the direction along the Z-axis. On the other hand, the second drive circuit substrate 17_2 is disposed at a position which does not overlap the second head H_2 when viewed in the direction along the Z-axis. According to this disposition of the first drive circuit substrate 17_1 and the second drive circuit substrate 17_2, a space for installing the other member such as the flow path member 11*a* can be sufficiently secured on the first head H_1 and the second head H_2. In addition, in this case, each advantageous effect of disposing the first circuit side terminal TC_1 at the position in the Z2-direction with respect to the second circuit side terminal TC_2 and each advantageous effect of disposing the fourth circuit side terminal TC_4 at the position in the Z2-direction with respect to the third circuit side terminal TC_3 can be remarkably obtained.

In addition, as described above, the first drive circuit 19_1 for switching the drive signal to be supplied to the first head H_1 is disposed on the surface facing the direction away from the first head H_1 out of both surfaces of the first flexible wiring substrate 15_1. On the other hand, the second drive circuit 19_2 for switching the drive signal to be supplied to the first head H_1 is disposed on the surface facing the direction away from the first head H_1 out of both surfaces of the second flexible wiring substrate 15_2. According to this disposition of the first drive circuit 19_1 and the second drive circuit 19_2, the terminal may be provided on each one surface of the first flexible wiring substrate 15_1 and the second flexible wiring substrate 15_2. Therefore, the costs of the flexible wiring substrate can be reduced, and additionally, the cost of the liquid discharge apparatus 100 can be reduced.

2. Modification Examples

The forms described above as example can be modified in various ways. Specific modification aspects that can be applied to the above-described forms will be described below as examples. Any two or more aspects selected from the following examples can be combined as appropriate within a mutually consistent range.

2-1. Modification Example 1

In the above-described embodiment, an aspect in which the drive circuit 19 is provided in the flexible wiring substrate 15 has been described as an example. However, the present disclosure is not limited to this aspect. For example, the drive circuit 19 may be provided in the head H, or may be provided in the wiring substrate 12. In addition, the drive circuit 19 may be provided on a surface of the flexible wiring substrate 15 which faces a direction closer to the head H.

2-2. Modification Example 2

In the above-described embodiment, an aspect in which an element relating to the first head H_1 and an element relating to the second head H_2 are configured to be symmetrical in the direction along the X-axis in the head unit 1 when viewed in the direction along the Y-axis has been described as an example. However, the present disclosure is not limited to this aspect. For example, the positions of the first drive circuit substrate 17_1 and the second drive circuit substrate 17_2 in the direction along the Z-axis may be different from each other. In addition, each length of the first flexible wiring substrate 15_1 and the second flexible wiring substrate 15_2 and each length of the third flexible wiring substrate 15_3 and the fourth flexible wiring substrate 15_4 may be different from each other.

2-3. Modification Example 3

The liquid discharge apparatus described in the above-described embodiment as an example can be adopted not only for an apparatus dedicated to printing but also for various apparatus such as a facsimile apparatus and a copying machine. As a matter of course, an application of the liquid discharge apparatus is not limited to the printing. For example, a liquid discharge apparatus that discharges a solution of a coloring material is used as a manufacturing apparatus forming a color filter of a display apparatus such as a liquid crystal display panel. In addition, a liquid discharge apparatus that discharges a solution of a conductive material is used as a manufacturing apparatus forming a wire or an electrode on a wiring substrate. In addition, a liquid discharge apparatus that discharges a solution of an organic substance relating to a living body is used as a manufacturing apparatus manufacturing a biochip, for example.

What is claimed is:

1. A liquid discharge apparatus comprising:

a head unit including a first head including a first piezoelectric element, a first head side terminal electrically coupled to the first piezoelectric element, a second piezoelectric element, a second head side terminal electrically coupled to the second piezoelectric element, a second head having a first portion which overlaps a first portion of the first head when viewed in a first direction and another portion which does not overlap the first portion of the first head when viewed in the first direction, and the second head is located at a position which does not overlap the first head when viewed in a second direction orthogonal to the first direction, and a fixing portion to which the first head and the second head are fixed;

a first drive circuit substrate provided with a first circuit side terminal and a second circuit side terminal;

a first flexible wiring substrate having one end coupled to the first head side terminal and the other end coupled to the first circuit side terminal, and drawn out from a position on one side of the first head in the first direction; and a second flexible wiring substrate having one end coupled to the second head side terminal and the other end coupled to the second circuit side terminal, and drawn out from a position on the other side of the first head in the first direction, wherein the first drive circuit substrate is provided at a position displaced to the other side in the first direction with respect to a center of the first head in the first direction, the first circuit side terminal is provided on a first surface of the first drive circuit substrate which faces one side in the first direction, the second circuit side terminal is provided on a second surface of the first drive circuit substrate which faces the other side in the first direction, when a direction orthogonal to both the first direction and the second direction is defined as a third direction, and a side on which the first head is viewed from the first drive circuit substrate along the third direction is defined as a predetermined side, the first circuit side terminal is provided at a position on the predetermined side with respect to the second circuit side terminal, the first circuit side terminal is disposed at a position on the predetermined side with respect to a center of the first drive circuit substrate in the third direction, and the second circuit side terminal is disposed at a position opposite to the predetermined side with respect to the center of the first drive circuit substrate in the third direction.

2. The liquid discharge apparatus according to claim 1, wherein when a distance between the first circuit side terminal and the second circuit side terminal in the third direction is defined as A, and a width of the first head in the first direction is defined as B, A<2×B.

3. The liquid discharge apparatus according to claim 2, wherein $$(1/2)\times B < A < (3/2)\times B.$$

4. The liquid discharge apparatus according to claim 2, wherein $$A < B.$$

5. The liquid discharge apparatus according to claim 2, wherein $$(1/2)\times B < A < B.$$

6. The liquid discharge apparatus according to claim 1, wherein a thickness of the first drive circuit substrate in the first direction is smaller than 1/10 times a width of the first head in the first direction.

7. The liquid discharge apparatus according to claim 1, wherein the fixing portion includes a holder that holds the first head and the second head, and a fixing plate that fixes the first head and the second head to the holder in common.

8. The liquid discharge apparatus according to claim 1, further comprising:

a first flow path member disposed at a position in the third direction with respect to the first head and the second head to supply a liquid to the first head and the second head.

9. The liquid discharge apparatus according to claim 8, wherein the first flexible wiring substrate passes between the first head and the first flow path member, and the second flexible wiring substrate does not pass between the first head and the first flow path member.

10. The liquid discharge apparatus according to claim 1, wherein a first drive circuit for switching a drive signal to be supplied to the first head is disposed on a surface facing a direction away from the first head out of both surfaces of the first flexible wiring substrate, and a second drive circuit for switching a drive signal to be supplied to the first head is disposed on a surface facing the direction away from the first head out of both surfaces of the second flexible wiring substrate.

11. A liquid discharge apparatus comprising:

a head unit including a first head including a first piezoelectric element, a first head side terminal electrically coupled to the first piezoelectric element, a second piezoelectric element, a second head side terminal electrically coupled to the second piezoelectric element, a second head having a first portion which overlaps a first portion of the first head when viewed in a first direction and another portion which does not overlap the first portion of the first head when viewed in the first direction, and the second head is located at a position which does not overlap the first head when viewed in a second direction orthogonal to the first direction, and a fixing portion to which the first head and the second head are fixed;

a first drive circuit substrate provided with a first circuit side terminal and a second circuit side terminal;

a first flexible wiring substrate having one end coupled to the first head side terminal and the other end coupled to the first circuit side terminal, and drawn out from a position on one side of the first head in the first direction;

a second flexible wiring substrate having one end coupled to the second head side terminal and the other end coupled to the second circuit side terminal, and drawn out from a position on the other side of the first head in the first direction;

a second drive circuit substrate provided with a third circuit side terminal and a fourth circuit side terminal;

a third flexible wiring substrate having one end coupled to a third head side terminal provided in the second head and the other end coupled to the third circuit side terminal, and drawn out from a position on one side of the second head in the first direction; and a fourth flexible wiring substrate having one end coupled to a fourth head side terminal provided in the second head and the other end coupled to the fourth circuit side terminal, and drawn out from a position on the other side of the first head in the first direction, wherein the first drive circuit substrate is provided at a position displaced to the other side in the first direction with respect to a center of the first head in the first direction, the first circuit side terminal is provided on a first surface of the first drive circuit substrate which faces one side in the first direction, the second circuit side terminal is provided on a second surface of the first drive circuit substrate which faces the other side in the first direction, when a direction orthogonal to both the first direction and the second direction is defined as a third direction, and a side on which the first head is viewed from the first drive circuit substrate along the third direction is defined as a predetermined side, the first circuit side terminal is provided at a position on the predetermined side with respect to the second circuit side terminal the second drive circuit substrate is provided at a position displaced to one side in the first direction with respect to a center of the second head in the first direction, the third circuit side terminal is provided on a third surface of the second drive circuit substrate which faces one side in the first direction, the fourth circuit side terminal is provided on a fourth surface of the second drive circuit substrate which faces the other side in the first direction, and the fourth circuit side terminal is provided at a position on the predetermined side of the second drive circuit substrate with respect to the third circuit side terminal.

12. The liquid discharge apparatus according to claim 11, wherein the head unit includes a first portion including a portion of the first head and a portion of the second head, a second portion including the other portion of the first head without including the second head, and having a shorter width than the first portion in the first direction, and a third portion including the other portion of the second head without including the first head, and having a shorter width than the first portion in the first direction.

13. The liquid discharge apparatus according to claim 11, wherein the first drive circuit substrate is disposed at a position which does not overlap the first head when viewed in the third direction, and the second drive circuit substrate is disposed at a position which does not overlap the second head when viewed in the third direction.

14. A liquid discharge apparatus comprising:

a head unit including a first head including a first piezoelectric element, a first head side terminal electrically coupled to the first piezoelectric element, a second piezoelectric element, a second head side terminal electrically coupled to the second piezoelectric element, a second head having a first portion which overlaps a first portion of the first head when viewed in a first direction and another portion which does not overlap the first head when viewed in the first direction, and the second head is located at a position which does not overlap the first head when viewed in a second direction orthogonal to the first direction, and a fixing portion to which the first head and the second head are fixed;

a first drive circuit substrate provided with a first circuit side terminal and a second circuit side terminal;

a first flexible wiring substrate having one end coupled to the first head side terminal and the other end coupled to the first circuit side terminal, and drawn out from a position on one side of the first head in the first direction; and a second flexible wiring substrate having one end coupled to the second head side terminal and the other end coupled to the second circuit side terminal, and drawn out from a position on the other side of the first head in the first direction, wherein the first drive circuit substrate is provided at a position displaced to the other side in the first direction with respect to a center of the first head in the first direction, the first circuit side terminal is provided on a first surface of the first drive circuit substrate which faces one side in the first direction, the second circuit side terminal is provided on a second surface of the first drive circuit substrate which faces the other side in the first direction, when a direction orthogonal to both the first direction and the second direction is defined as a third direction, and a side on which the first head is viewed from the first drive circuit substrate along the third direction is defined as a predetermined side, the first circuit side terminal is provided at a position on the predetermined side with respect to the second circuit side terminal, when a distance between the first circuit side terminal and the second circuit side terminal in the third direction is defined as A, and a width of the first head in the first direction is defined as B, A<2×B, and $$(1/2)\times B<A<(3/2)\times B.$$

* * * * *